United States Patent
Sitnikov et al.

(10) Patent No.: US 11,359,360 B2
(45) Date of Patent: *Jun. 14, 2022

(54) SELF-CONTAINED HYDRANT MONITORING SYSTEM

(71) Applicant: Mueller International, LLC, Atlanta, GA (US)

(72) Inventors: Timofey Sitnikov, Harrison, TN (US); Paul S. Gifford, Chattanooga, TN (US); Carlos Stephen Moreno, Chattanooga, TN (US); Diego Aguilera, Chattanooga, TN (US); Daryl Lee Gibson, Cleveland, TN (US)

(73) Assignee: Mueller International, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/187,448

(22) Filed: Feb. 26, 2021

(65) Prior Publication Data

US 2021/0180297 A1   Jun. 17, 2021

Related U.S. Application Data

(63) Continuation of application No. 16/434,915, filed on Jun. 7, 2019, now Pat. No. 10,968,609.

(51) Int. Cl.
*E03B 9/02* (2006.01)
*G01F 15/18* (2006.01)
*G01F 1/075* (2006.01)

(52) U.S. Cl.
CPC ............... *E03B 9/02* (2013.01); *G01F 15/18* (2013.01); *G01F 1/075* (2013.01); *Y10T 137/5327* (2015.04)

(58) Field of Classification Search
CPC ........................ Y10T 137/5327; G01F 15/18
See application file for complete search history.

(56) References Cited

U.S. PATENT DOCUMENTS

| | | | |
|---|---|---|---|
| 4,790,341 A | 12/1988 | Laurel | |
| 4,791,952 A | 12/1988 | Laurel | |
| 4,793,557 A ‡ | 12/1988 | Marchese | A62C 31/24 169/24 |
| 4,936,336 A | 6/1990 | McCauley et al. | |
| D314,227 S ‡ | 1/1991 | Christ | D23/21 |
| 5,727,590 A | 3/1998 | Julicher et al. | |
| 6,356,811 B1 | 3/2002 | Beselt | |
| 6,816,072 B2 ‡ | 11/2004 | Zoratti | A62C 31/28 137/27 |
| 7,980,317 B1 ‡ | 7/2011 | Preta | A62C 37/00 169/61 |

(Continued)

OTHER PUBLICATIONS

Sitnikov, Timofey; Corrected Notice of Allowance for U.S. Appl. No. 16/435,357, filed Jun. 7, 2019, dated Jan. 29, 2021, 4 pgs.‡

(Continued)

*Primary Examiner* — Kevin R Barss
(74) *Attorney, Agent, or Firm* — Taylor English Duma LLP

(57) ABSTRACT

A sensing device for a hydrant can include a housing defining a portion of an operating stem of the hydrant; a vein connected to the housing, the vein defining a channel; a sensor received within the channel of the vein; and an antenna in communication with the sensor and positioned within the housing.

20 Claims, 21 Drawing Sheets

(56) References Cited

U.S. PATENT DOCUMENTS

| | | | | |
|---|---|---|---|---|
| 8,130,107 | B2 ‡ | 3/2012 | Meyer | G05D 7/0617 |
| | | | | 340/60 |
| 8,589,092 | B2 ‡ | 11/2013 | Plouffe | E03B 9/02 |
| | | | | 702/50 |
| 8,614,745 | B1 ‡ | 12/2013 | Al Azemi | H04N 7/183 |
| | | | | 348/159 |
| 8,657,021 | B1 ‡ | 2/2014 | Preta | H04Q 9/00 |
| | | | | 169/61 |
| 8,931,505 | B2 ‡ | 1/2015 | Hyland | F17D 5/02 |
| | | | | 137/29 |
| 9,291,520 | B2 ‡ | 3/2016 | Fleury, Jr. | H01Q 1/42 |
| 9,388,554 | B2 ‡ | 7/2016 | Bost | F16K 27/006 |
| 9,458,609 | B2 | 10/2016 | Fleury, Jr. et al. | |
| D790,663 | S ‡ | 6/2017 | Petersen | D23/23 |
| 9,670,650 | B2 ‡ | 6/2017 | Pinney | E03B 9/02 |
| 9,849,322 | B2 ‡ | 12/2017 | Hyland | A62C 37/50 |
| 9,861,848 | B2 ‡ | 1/2018 | Hyland | G01M 3/00 |
| 9,873,008 | B2 ‡ | 1/2018 | Silvers | H04W 4/20 |
| 9,901,765 | B2 ‡ | 2/2018 | Silvers | H04W 4/38 |
| 10,274,632 | B1 | 4/2019 | Olsson et al. | |
| 10,317,384 | B2 | 6/2019 | Morrow et al. | |
| 10,612,216 | B2 ‡ | 4/2020 | Kennedy | E03B 9/04 |
| 10,921,304 | B2 | 2/2021 | Morrow et al. | |
| 10,934,693 | B2 | 3/2021 | Sitnikov | |
| 10,941,545 | B2 | 3/2021 | Sitnikov | |
| 10,968,609 | B2 | 4/2021 | Sitnikov | |
| 11,067,464 | B2 | 7/2021 | Moreno et al. | |
| 2008/0189056 | A1 ‡ | 8/2008 | Heidl | G01F 15/18 |
| | | | | 702/45 |
| 2008/0281534 | A1 | 11/2008 | Hurley | |
| 2014/0373941 | A1 | 12/2014 | Varman et al. | |
| 2017/0082592 | A1 ‡ | 3/2017 | Morrow | H04W 4/021 |
| 2017/0121949 | A1 ‡ | 5/2017 | Fleury, Jr. | G01M 3/00 |
| 2017/0370893 | A1 ‡ | 12/2017 | West | E03B 7/072 |
| 2018/0093117 | A1 ‡ | 4/2018 | Hyland | F17D 1/04 |
| 2020/0071916 | A1 ‡ | 3/2020 | Feyling | E03B 9/04 |
| 2020/0080290 | A1 ‡ | 3/2020 | Kennedy | E03B 7/095 |
| 2020/0384296 | A1 ‡ | 12/2020 | Sitnikov | A62C 35/20 |
| 2020/0385960 | A1 | 12/2020 | Sitnikov et al. | |
| 2020/0385961 | A1 ‡ | 12/2020 | Sitnikov | E03B 9/04 |
| 2020/0385962 | A1 ‡ | 12/2020 | Sitnikov | G01L 19/086 |
| 2021/0079631 | A1 | 3/2021 | Sitnikov et al. | |
| 2021/0198873 | A1 | 7/2021 | Sitnikov et al. | |

OTHER PUBLICATIONS

Sitnikov, Timofey; Corrected Notice of Allowance for U.S. Appl. No. 16/435,357, filed Jun. 7, 2019, dated Dec. 16, 2020, 5 pgs.‡

Sitnikov, Timofey; Corrected Notice of Allowance for U.S. Appl. No. 16/435,339, filed Jun. 7, 2019, dated Feb. 9, 2021, 6 pgs.‡

Sitnikov, Timofey; Corrected Notice of Allowance for U.S. Appl. No. 16/435,339, filed Jun. 7, 2019, dated Dec. 16, 2020, 7 pgs.‡

Nighthawk; Info Sheet for Intelligent Hydrant Solutions Remote Pressure and Temperature Monitoring, located <http://nighthawkcontrol.com/upl/downloads/industry-solutions/reference/ihydrant-poster-presentation-wet-dry-barrel-15988aaa.pdf>, accessible at least as early as Apr. 19, 2019, 1 pg.‡

Nighthawk; Info Sheet for iHydrant: Remote Hydrant Pressure & Temperature Monitoring, located at <http://nighthawkcontrol.com/upl/downloads/industry-solutions/reference/ihydrant-info-sheet-71fd3465.pdf>, accessible at least as early as Apr. 19, 2019, 1 pg.‡

Terepac; Article entitled: "One Water", located at <https://www.terepac.com/one-water>, available at least as early as Mar. 2019 according to the Wayback Machine, 5 pgs.‡

Hydrant Network Solutions Inc.; Article entitled: "Hydrant Data Rod", copyright 2016, 1 pg.‡

Hydrant Network Solutions Inc.; Brochure for Hydrant Data Rod, publicly available at least as early as Jun. 12, 2018, 6 pgs.‡

Eramosa Engineering, Inc.; Report on Test of Hydrant Network Solutions Inc., Data Rod Assembly for Dry-Barrel Fire Hydrants, publicly available at least as early as Jun. 12, 2018, 23 pgs.‡

Sitnikov, Timofey; Non-Final Office Action for U.S. Appl. No. 16/435,339, filed Jun. 7, 2019, dated Jun. 1, 2020, 12 pgs.‡

Sitnikov, Timofey; Corrected Notice of Allowance for U.S. Appl. No. 16/435,357, filed Jun. 7, 2019, dated Oct. 6, 2020, 4 pgs.‡

Sitnikov, Timofey; Notice of Allowance for U.S. Appl. No. 16/435,357, filed Jun. 7, 2019, dated Oct. 2, 2020, 11 pgs.‡

Sitnikov, Timofey; Notice of Allowance for U.S. Appl. No. 16/435,339, filed Jun. 7, 2019, dated Sep. 8, 2020, 5 pgs.‡

Sitnikov, Timofey; Applicant-Initiated Interview Summary for U.S. Appl. No. 16/434,915, filed Jun. 7, 2019, dated Oct. 19, 2020, 7 pgs. Note: Copy not provided as part of PTO records.

Sitnikov, Timofey; Applicant-Initiated Interview Summary for U.S. Appl. No. 16/434,915, filed Jun. 7, 2019, dated Nov. 20, 2020, 7 pgs. Note: Copy not provided as part of PTO records.

Sitnikov, Timofey; Corrected Notice of Allowance for U.S. Appl. No. 16/434,915, filed Jun. 7, 2019, dated Feb. 17, 2021, 8 pgs. Note: Copy not provided as part of PTO records.

Sitnikov, Timofey; Non-Final Office Action for U.S. Appl. No. 16/434,915, filed Jun. 7, 2019, dated Sep. 10, 2020, 22 pgs. Note: Copy not provided as part of PTO records.

Sitnikov, Timofey; Notice of Allowance for U.S. Appl. No. 16/434,915, filed Jun. 7, 2019, dated Dec. 7, 2020, 7 pgs. Note: Copy not provided as part of PTO records.

Sitnikov, Timofey; Supplemental Notice of Allowance for U.S. Appl. No. 16/434,915, filed Jun. 7, 2019, dated Mar. 9, 2021, 4 pgs. Note: Copy not provided as part of PTO records.

Sitnikov, Timofey; Non-Final Office Action for U.S. Appl. No. 17/104,637, filed Nov. 25, 2020, dated Sep. 14, 2021, 10 pgs.

Sitnikov, Timofey; Non-Final Office Action U.S. Appl. No. 16/435,004, filed Jun. 7, 2019, dated Dec. 10, 2021, 37 pgs.

Sitnikov, Timofey; Applicant-Initiated Interview Summary for U.S. Appl. No. 17/104,637, filed Nov. 25, 2020, dated Dec. 14, 2021, 2 pgs.

Sitnikov, Timofey; Non-Final Office Action for U.S. Appl. No. 17/141,743, filed Jan. 5, 2021, dated Oct. 25, 2021, 17 pgs.

Sitnikov, Timofey; Applicant-Initiated Interview Summary for U.S. Appl. No. 16/435,004, filed Jun. 7, 2019, dated Feb. 18, 2022, 2 pgs.

Sitnikov, Timofey; Notice of Allowance for U.S. Appl. No. 16/435,004, filed Jun. 7, 2019, dated Mar. 21, 2022, 22 pgs.

Sitnikov, Timofey; Notice of Allowance for U.S. Appl. No. 17/104,637, filed Nov. 25, 2020, dated Mar. 9, 2022, 8 pgs.

Sitnikov, Timofey; Notice of Allowance for U.S. Appl. No. 17/141,743, filed Jan. 5, 2021, dated Apr. 29, 2022, 8 pgs.

‡ imported from a related application

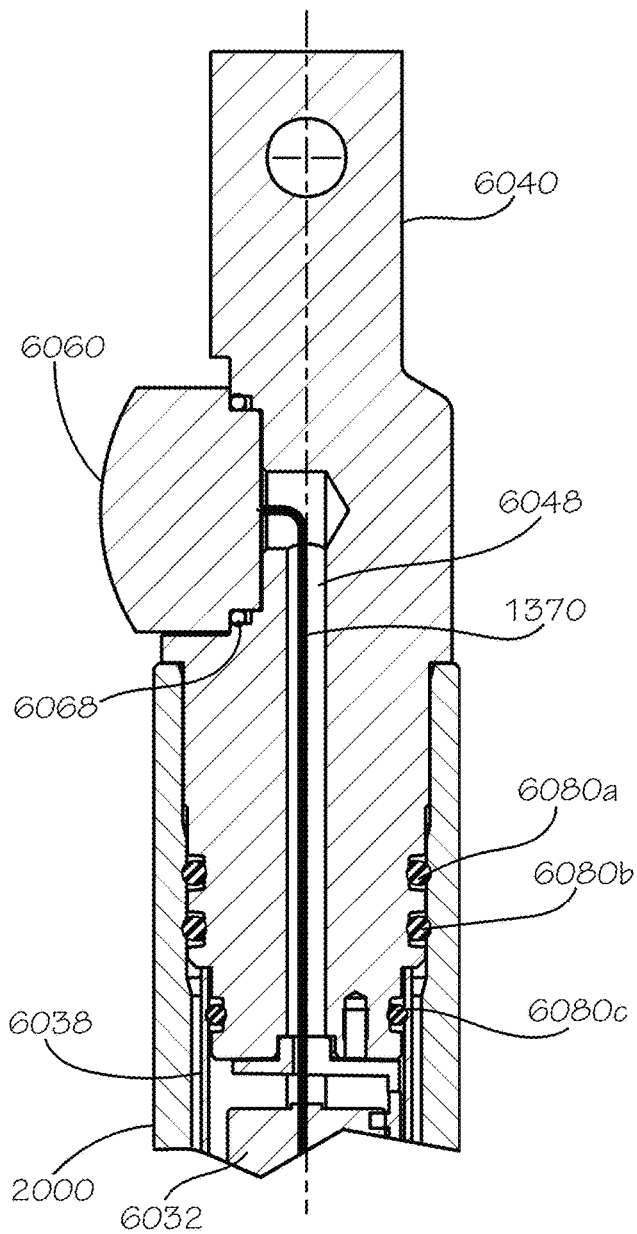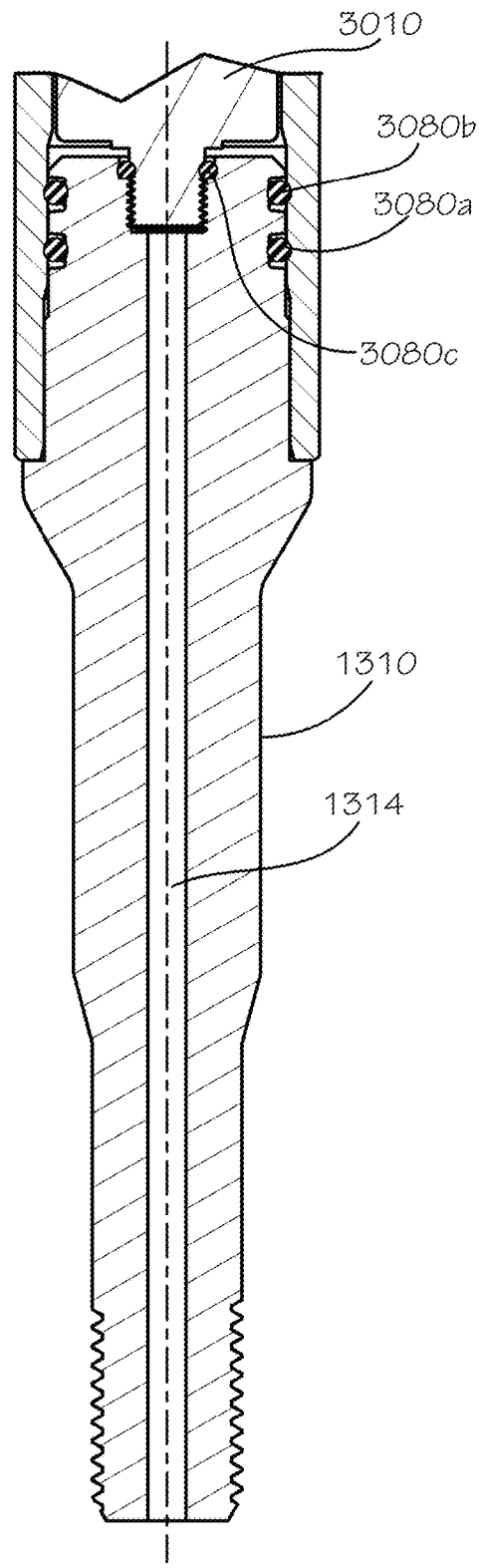
FIG. 11
FIG. 12

SELF-CONTAINED HYDRANT MONITORING SYSTEM

REFERENCE TO RELATED APPLICATIONS

This application is a continuation of U.S. application Ser. No. 16/434,915, filed Jun. 7, 2019, which is hereby specifically incorporated by reference herein in its entirety.

TECHNICAL FIELD

Field of Use

This disclosure relates to fire hydrants. More specifically, this disclosure relates to hydrants able to collect and relay system data.

Related Art

Proper maintenance of a water system ideally requires knowledge about each aspect of the system—particularly knowledge regarding water pressure and other characteristics of flow in the line. To attain the required knowledge, one approach includes sensing flow at each point. However, in the field, placing sensors can be difficult without significant expense or affecting the data being measured or taking equipment useful for public safety out of temporary service.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a hydrant for a fluid distribution system, the hydrant comprising: a hydrant body defining a top end, a bottom end, an interior cavity, and a shoe cavity; a valve located in sealable communication with the hydrant body, the interior cavity in fluid communication with the shoe cavity when the valve is open, the valve configured to seal the interior cavity of the hydrant from the shoe cavity when the valve is closed, the valve comprising a valve member defining a member bore; a stem secured to the valve, positioned at least partly inside the interior cavity of the hydrant, and extending from the top end of the hydrant body to the valve, the stem configured to open and close the valve, the stem comprising a vein defining a channel extending from a lower end of the vein to an upper end of the vein; and a sensing device comprising: a sensor located entirely within the interior cavity of the hydrant body and configured to measure a property of a fluid of the fluid distribution system; at least one battery in communication with the sensor and located entirely within the interior cavity of the hydrant body; and an antenna in communication with the sensor and located entirely within the interior cavity of the hydrant body.

In a further aspect, disclosed is a sensing device for a hydrant, the sensing device comprising: a housing defining a portion of an operating stem of the hydrant; a vein connected to the housing, the vein defining a channel; a sensor received within the channel of the vein; and an antenna in communication with the sensor and positioned within the housing.

In yet another aspect, disclosed is a method comprising: measuring a characteristic of a fluid inside a hydrant of a fluid distribution system with a sensing device, the sensing device comprising: a vein defining a channel; a sensor received within the channel of the vein; at least one battery in communication with the sensor; and an antenna in communication with the sensor; and transmitting data corresponding to the characteristic of the fluid from the sensor to the antenna.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

FIG. 11 is a detail sectional view of the upper stem end of the operating stem of FIG. 10 taken along line 11-11 of FIG. 2 and, alternatively, detail 11 of FIG. 10.

FIG. 12 is a detail sectional view of the lower stem end of the operating stem of FIG. 10 taken along line 12-12 of FIG. 2 and, alternatively, detail 12 of FIG. 10.

DETAILED DESCRIPTION

Figure 1:
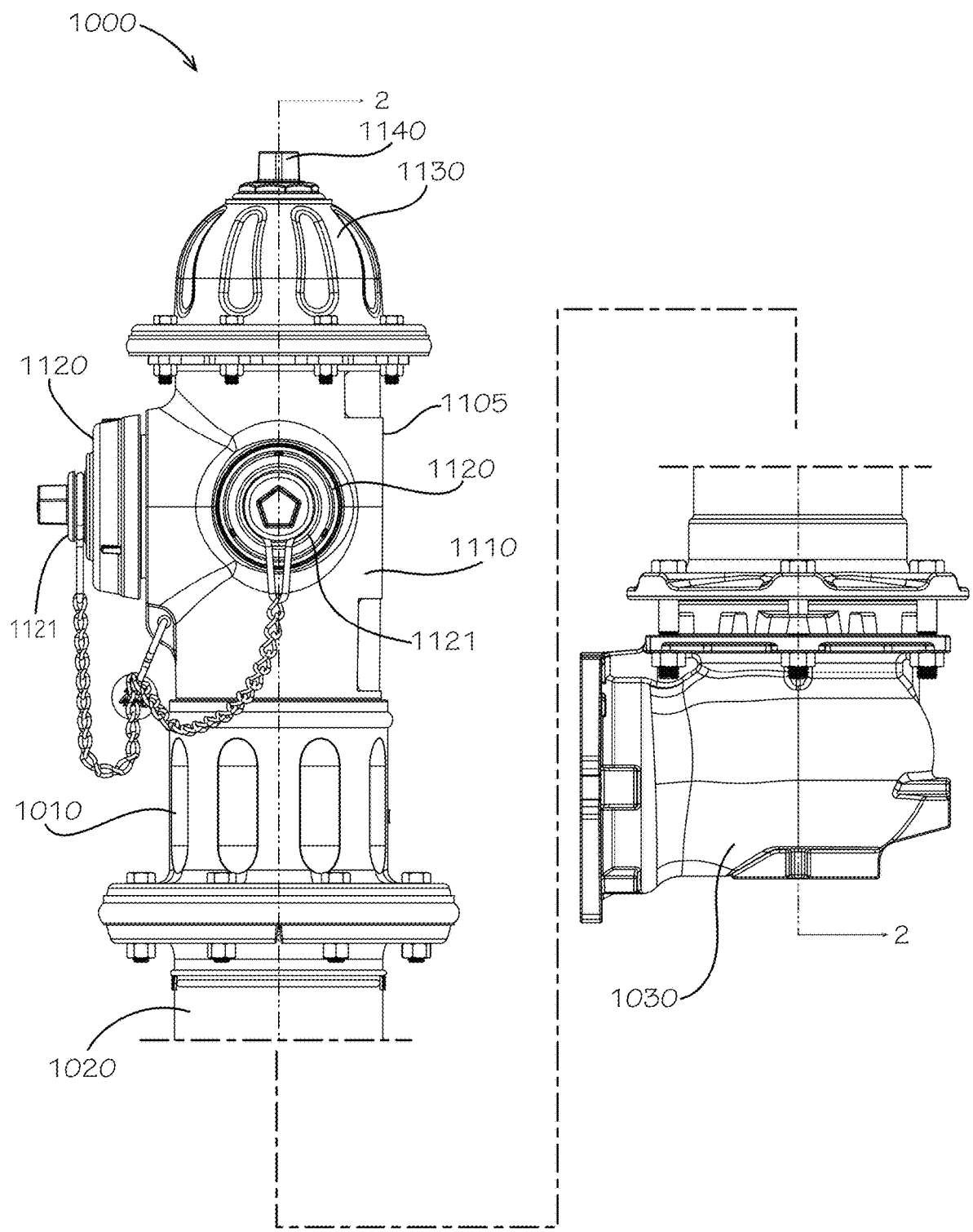
FIG. 1 is a side view of a hydrant in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that end of the hydrant nearest to a main nozzle; "rear" is that end of the hydrant that is opposite or distal the front; "left" is that which is to the left of or facing left from a person facing towards the front; and "right" is that which is to the right of or facing right from that same person facing towards the front. "Horizontal" or "horizontal orientation" describes that which is in a plane extending from left to right and aligned with the horizon. "Vertical" or "vertical orientation" describes that which is in a plane that is angled at 90 degrees to the horizontal.

In one aspect, a hydrant and associated methods, systems, devices, and various apparatuses are disclosed herein. In various aspects, the hydrant can comprise a sensing device. In various aspects, the hydrant can comprise a communications hub in wireless communication with the sensing device and with a network. It would be understood by one of skill in the art that the disclosed hydrant is described in but a few exemplary aspects among many. No particular terminology or description should be considered limiting on the disclosure or the scope of any claims issuing therefrom.

A fluid distribution system such as, for example and without limitation, a municipal water system, can comprise a hydrant 1000, which can be a fire hydrant. FIG. 1 is a side view of the hydrant 1000 in accordance with one aspect of the current disclosure. As shown, the hydrant 1000 can comprise a hydrant body 1105, which can comprise an upper barrel assembly 1010, a lower barrel assembly 1020, and a shoe 1030. In various aspects, the upper barrel assembly 1010 of the hydrant 1000 can be positioned above ground, the lower barrel assembly 1020 can be at least partially subterranean, and the shoe 1030 can be connected to the fluid distribution system and can be installed in the ground.

Figure 2:
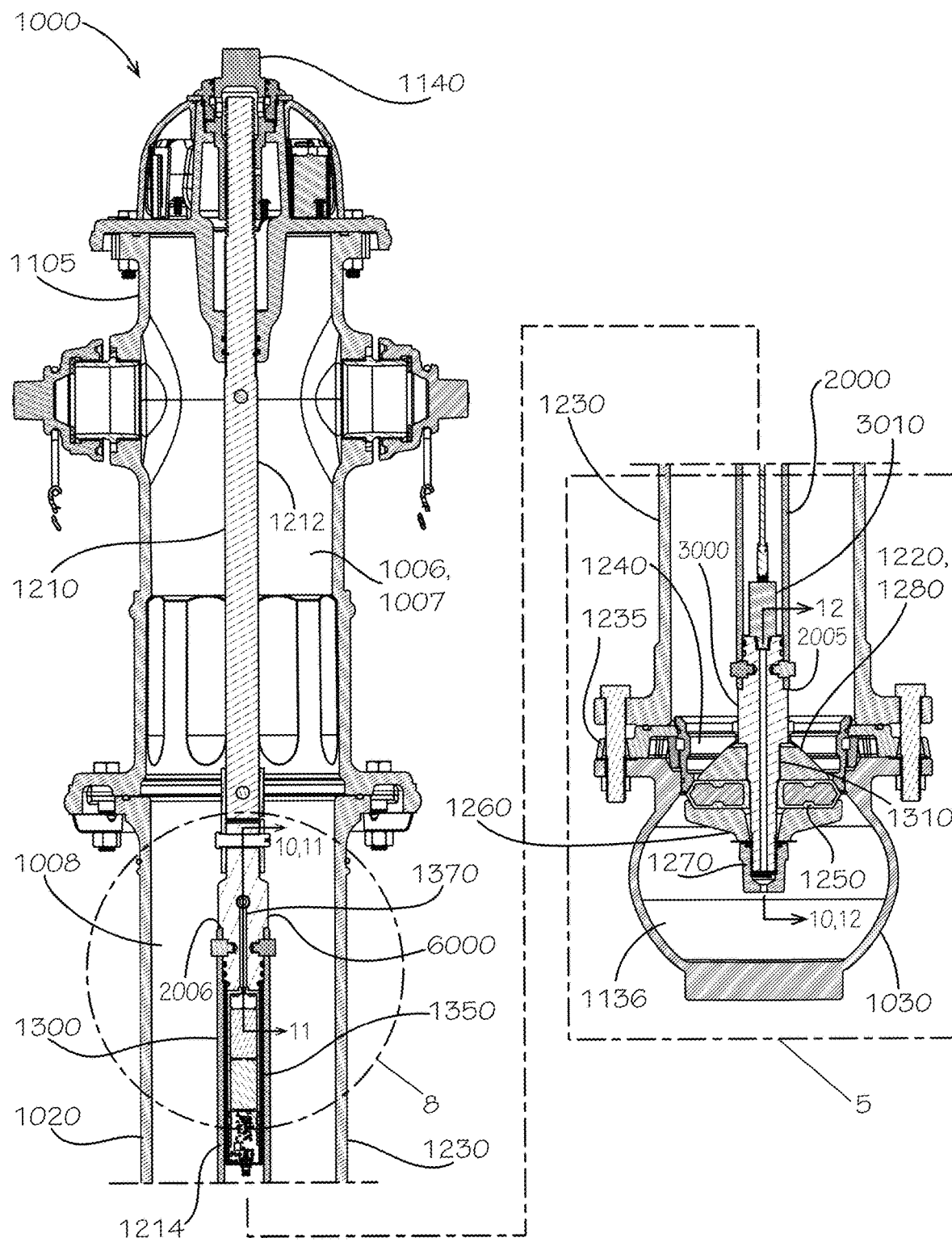
FIG. 2 is a sectional view of the hydrant of FIG. 1 taken along line 2-2 of FIG. 1.

As shown in FIG. 2, the hydrant body 1105 can define an interior cavity 1006. More specifically, the upper barrel assembly 1010 can define an upper portion 1007 of the interior cavity 1006; and the lower barrel assembly 1020 can define a lower portion 1008 of the interior cavity 1006. The shoe 1030 can define a shoe cavity 1136.

As shown in FIG. 1, the upper barrel assembly 1010 can comprise an upper barrel 1110, a plurality of nozzles 1120 that can be configured to connect fire hoses or other equipment, nozzle caps 1121 covering the nozzles 1120 that can be adapted or configured to be removable, and a bonnet 1130 that can be secured to the upper barrel 1110. As shown, the bonnet 1130 can be attached to the upper barrel 1110 by bolts. The upper barrel assembly 1010 can be connected or attached to the lower barrel assembly 1020; in the current aspect, the attachment can be made by bolts. An operating stem 1210 (shown in FIG. 2) can be positioned within the hydrant 1000 and can extend from the bonnet 1130 to a valve 1220 (shown in FIG. 2), which can be a valve assembly and can be positioned proximate to or at a junction between the shoe 1030 and the lower barrel assembly 1020. The operating stem 1210 can be actuated by an operating nut 1140 at a top end of the bonnet 1130. More specifically, the operating stem 1210 can be configured to open and close the valve upon rotation of the operating nut 1140 about a stem axis defined by the operating stem 1210.

FIG. 27 is a sectional view of the hydrant 1000. As shown, the operating stem 1210 can connect to the valve 1220 for actuation of the valve 1220 when in use. The lower barrel assembly 1020 can comprise a lower barrel 1230. In a typical arrangement in which the hydrant 1000 is a dry barrel hydrant, the hydrant 1000 can be in a state such that no water is located in the upper barrel 1110 or the lower barrel 1230—such as when the valve 1220 is closed. In use, the valve 1220 can be operated by the operating nut 1140 to open the valve 1220 and to thereby allow the flow of water into the lower barrel 1230 and the upper barrel 1110. As shown in FIG. 2, a spacer 1235 can be positioned between the lower barrel 1230 and the shoe 1030.

The valve 1220 can comprise multiple components. A valve member 1250 can comprise a rigid or semi-rigid disc and can be encapsulated in a flexible material or other covering or coating. In various aspects, the valve member 1250 can be coated in a sealing material such as rubber or elastomer. When the valve 1220 is closed, the valve member 1250 can seal against a valve seat 1240, thereby preventing water from ascending into the lower barrel 1230. The valve 1220 can comprise a valve retainer 1260 located adjacent to and below the valve member 1250. In various aspects, the valve retainer 1260 can push or press the valve member 1250 against the valve seat 1240. A valve nut 1270 can be attached or connected to an end of the operating stem 1210 to secure the valve member 1250 and the valve retainer 1260 to the operating stem 1210 and to push or press the valve retainer 1260 against the valve member 1250. A reinforcement member 1280 can be attached to or located proximate to an opposite end of the valve member 1250 to help fix the location of the valve member 1250 and to prevent movement by or damage to the valve member 1250 due to the high water pressure inside the shoe cavity 1136.

In various aspects, the hydrant 1000 can comprise a sensing device 1300. As will be described in more detail below, the sensing device 1300 can comprise a sensor 3010, at least one battery 1350, and an antenna 1370. The operating stem 1210 can comprise an upper stem 1212 and a lower stem 1214. The lower stem 1214 can comprise a lower stem bottom end 3000, a lower stem top end 6000, a stem pipe 2000 joining the lower stem bottom end 3000 and the lower stem top end 6000, and the sensing device 1300, which can be housed therein. In some aspects, as shown, the lower stem bottom end 3000 can be coupled to the stem pipe 2000 at a lower end or first end 2005 of the stem pipe 2000 and the lower stem top end 6000 can be coupled to the stem pipe 2000 at an upper end or second end 2006 of the stem pipe 2000. As shown, each of the valve member 1250, the valve retainer 1260, and the reinforcement member 1280 can comprise features allowing the sensing device 1300 to have access the fluid in the fluid distribution system. With such access, the sensing device 1300 can sense properties of the fluid. As such, as will be described in more detail below, the operating stem 1210 can comprise a vein 1310 configured to expose the sensor 3010 to the fluid whose properties are to be measured.

Figure 3:
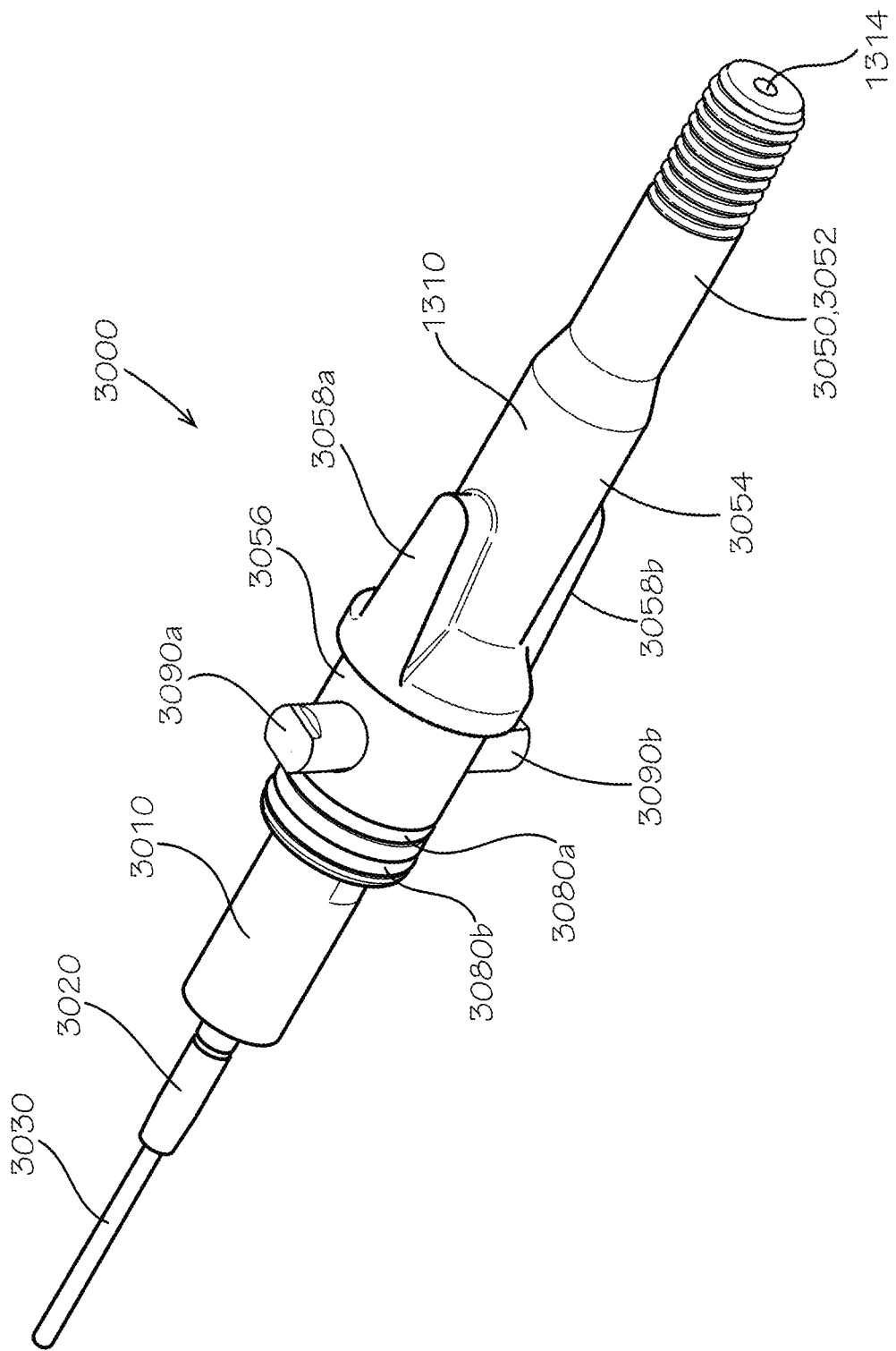
FIG. 3 is a bottom perspective view of a vein of a lower stem end of an operating stem of the hydrant of FIG. 1 in an assembled condition.
Figure 4:
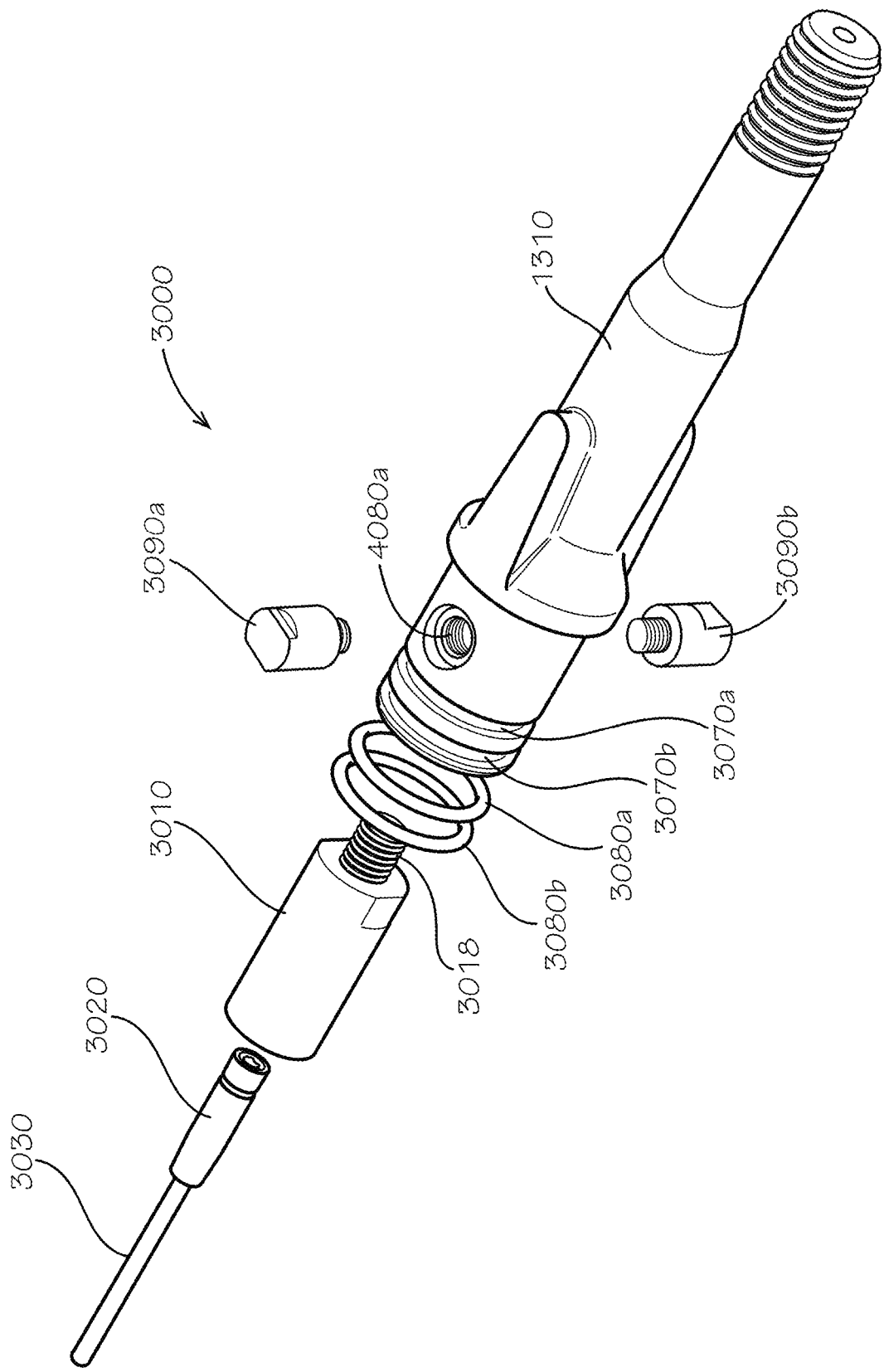
FIG. 4 is a bottom perspective view of the lower stem end of FIG. 3 in an exploded or disassembled condition.

FIG. 28 is a bottom perspective view of the vein 1310 of the lower stem bottom end 3000 of the sensing device 1300 of the operating stem 1210 of the hydrant 1000 in an assembled condition, and FIG. 29 is a bottom perspective view of the lower stem bottom end 3000 in an exploded or disassembled condition. As shown in FIG. 3, the lower stem bottom end 3000 of the operating stem 1210 can comprise the vein 1310. The vein 1310, which in various aspects can incorporate the features of a valve stem including a shaft sized to receive the valve member 250, can define a channel 1314. The lower stem bottom end 3000 can further comprise the sensor 3010 coupled to the vein 1310, a sensor connector 3020 coupled to the sensor 3010, a sensor wire 3030 coupled to the sensor connector 3020 and to the lower stem top end 6000 (shown in FIG. 2), a pair of O-rings 3080*a,b* sized to be received within a pair of grooves 3070*a,b* (shown in FIG. 4) defined proximate to a top end of the vein 1310, and a pair of fasteners 3090*a,b* sized to be received within a pair of bores 4080*a,b* (4080*a* shown in FIG. 4, 4080*b* shown in FIG. 5) defined within the vein 1310. In some aspects, the fasteners 3090*a,b* can be shoulder screws. In other aspects, the fasteners 3090*a,b* can be another type of fastener.

As shown in FIG. 3, the vein 1310 can comprise a valve stem shaft 3050, which can be divided into a first portion 3052 and a second portion 3054. The first portion 3052 can be sized to receive the valve member 250, the valve retainer

1260, and the valve nut 1270, each of which can be a standard component used in hydrants of the type shown. The second portion 3054 can be sized to receive the reinforcement member 1280 and can define two lobes 3058a,b for fixing a rotational position or orientation of the reinforcement member 1280 relative to the valve stem shaft 3050 and the vein 1310 of which it is part. The vein 1310 can further comprise a third portion 3056, which can be sized to be received within the stem pipe 2000 and seal against an interior surface of the stem pipe 2000 using, for example, the O-rings 3080a,b). The first portion 3052, the second portion 3054, and the lobes 3058a,b of the valve stem shaft 3050 can vary in shape and diameter as shown to more easily mate with the proper components in the proper order in a way that communicates to a technician that such assembly is proper and, as suggested already above, to be able to be backwards compatible with previous designs for each of the recited components. As shown in FIG. 4, the sensor 3010 can comprise a threaded portion 3018, which can be received within a bore 5080 (shown in FIG. 5) of the vein 1310.

In some aspects, the sensor 3010 is a pressure sensor for measuring a pressure of the fluid in the disclosed fluid distribution system. In other aspects, the sensor 3010 is a sensor measuring any one of a number of other fluid properties, including, for example and without limitation, temperature. The sensor 3010 can be potted with potting material configured to seal a portion of the sensor 3010 containing electronics against water intrusion.

Figure 5:
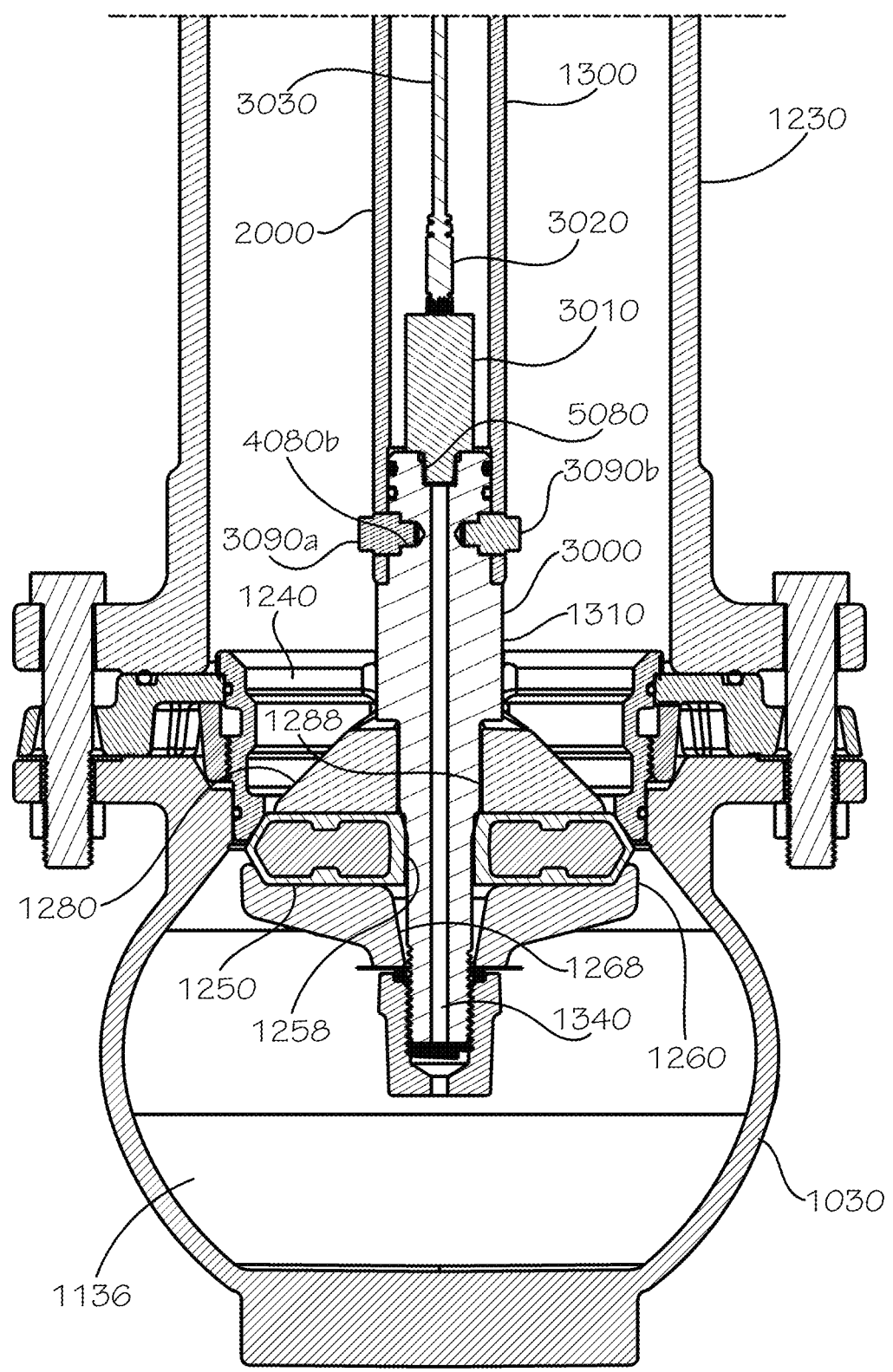
FIG. 5 is a detail sectional view of the hydrant of FIG. 1 taken from detail 5 of FIG. 2 showing the lower stem end of FIG. 3 as well as a main valve assembly of the hydrant.

FIG. 5 is a detail sectional view of the hydrant 1000 showing the lower stem bottom end 3000 of FIG. 3 as well as the valve 1220 and surrounding structure of the hydrant 1000. Again, the valve member 250, which can define a member bore 1258 sized to receive the lower stem bottom end 3000, can be engaged as shown against the valve seat 1240, thereby closing the valve 1220. Even in the closed position of the valve 1220, however, the vein 1310 and specifically the channel 1340 defined therein can allow the sensing device 1300 and specifically the sensor 3010 to nonetheless be in fluid communication with the shoe cavity 1136 with the fluid of the fluid distribution system for system monitoring purposes. In some aspects, as shown, the sensor 3010 can be positioned proximate to the upper end of the channel 1314 of the vein 1310. More specifically, the sensor 3010 can be positioned facing the channel 1314 of the vein 1310 to measure a property of a fluid of the fluid system.

A retainer bore 1268 can be defined in the valve retainer 1260 and a reinforcement member bore 1288 can be defined within the reinforcement member 1280. As such, each of the valve member 1250, the valve retainer 1260, and the reinforcement member 1280 can define a bore for passage of the lower stem bottom end 3000 including the vein 1310.

In some aspects, as shown, the vein 1310 can be generally cylindrical or comprise cylindrical portions; in other aspects, the vein 1310 can be conical, frustoconical, or a variety of shapes as would be desired and understood by one in the art. The vein 1310 can define a lower portion of the sensing device 1300. The stem pipe 2000 can be attached or connected to the vein 1310. In various aspects, portions of the stem pipe 2000 can in fluid communication with the vein 1310; in various aspects, portions of the stem pipe 2000 can be sealed or otherwise isolated from fluid.

Figure 6:
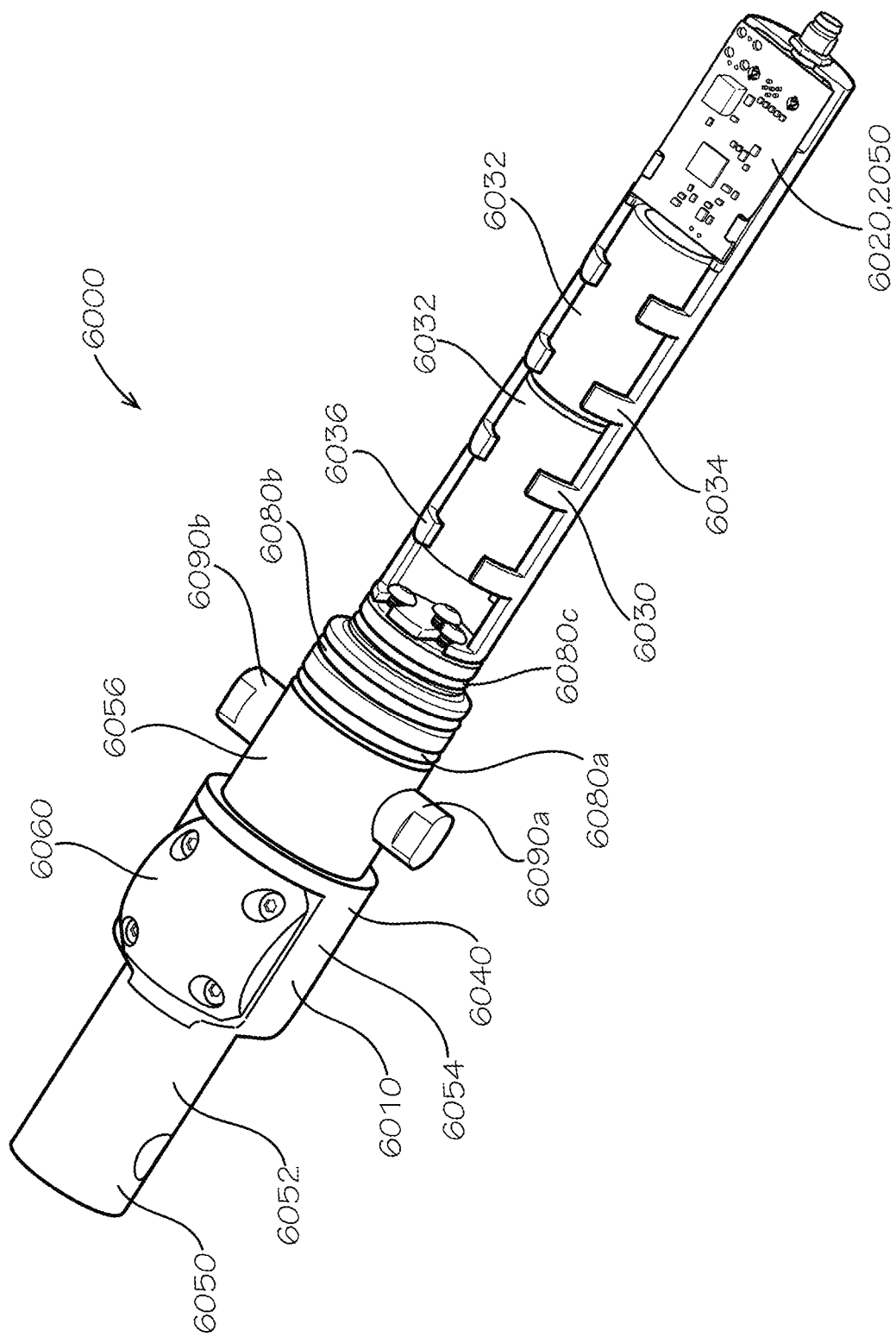
FIG. 6 is a bottom perspective view of an upper stem end of the operating stem of the hydrant of FIG. 1 in an assembled condition.
Figure 7:
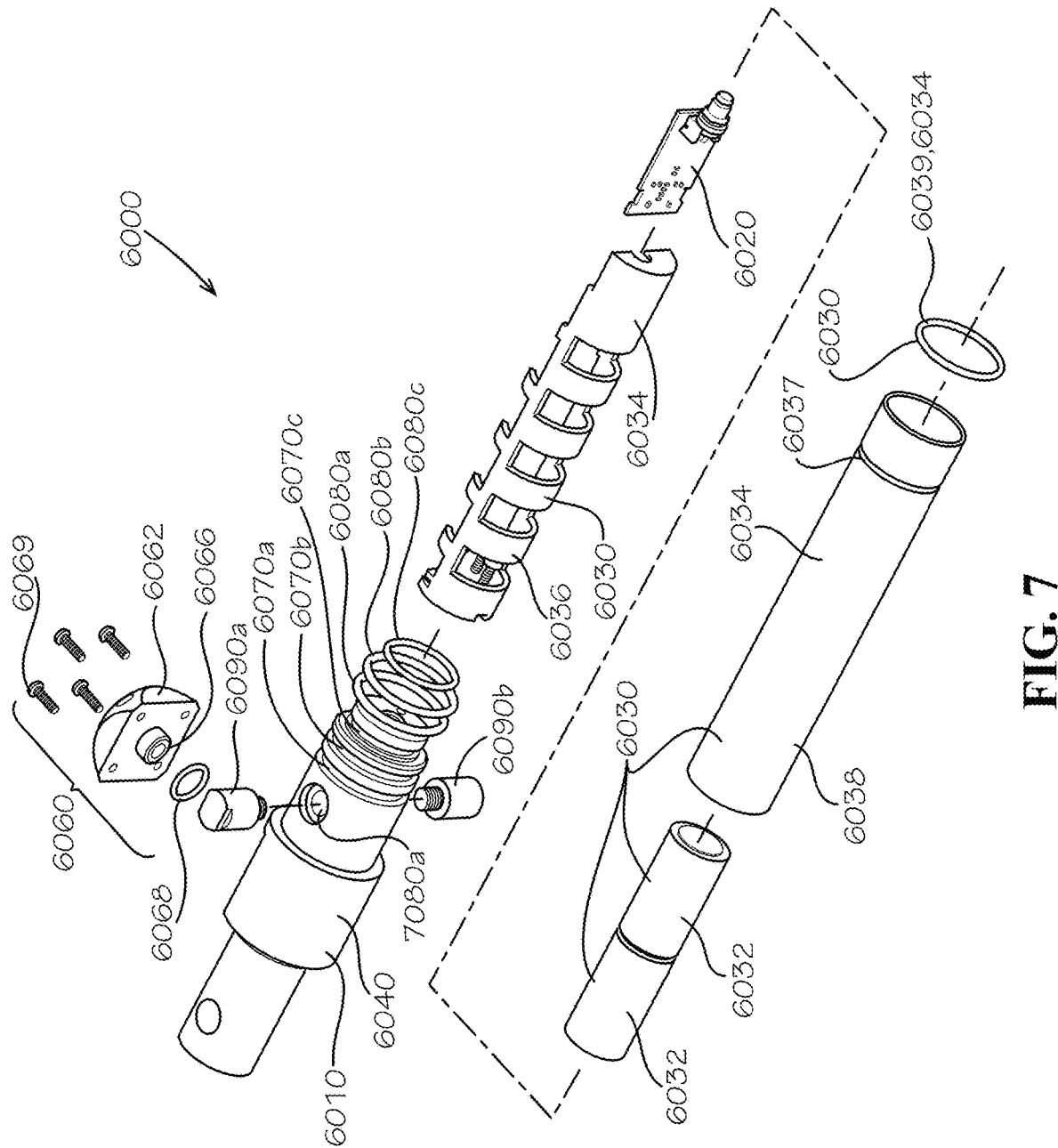
FIG. 7 is a bottom perspective view of the upper stem end of FIG. 6 in an exploded or disassembled condition.

FIG. 6 is a bottom perspective view of a lower stem top end 6000 of the sensing device 1300 of the operating stem 1210 of the hydrant 1000 in an assembled condition, and FIG. 7 is a bottom perspective view of the lower stem top end 6000 in an exploded or disassembled condition. The lower stem top end 6000 can comprise a top stem housing 6010, a sensor printed circuit board (PCB) 6020, and a battery pack 6030, As shown in FIG. 6, the top stem housing 6010 can comprise a fitting 6040, the antenna 1370 (shown in FIG. 2), and an antenna cover assembly 6060. The top stem housing 6010 can further comprise three O-rings 6080a,b,c sized to be received within grooves 6070a,b,c (shown in FIG. 7) defined proximate to a bottom end of the fitting 6040, and a pair of fasteners 6090a,b can be sized to be received within a pair of bores 7080a,b (7080a shown in FIG. 7, 7080b shown in FIG. 8) defined within the fitting 6040. In some aspects, the fasteners 6090a,b can be shoulder screws. In other aspects, the fasteners 6090a,b can be another type of fastener. The antenna 1370 can be in electrical communication with the sensor 3010 and also in wireless communication with a communications hub 1920 to be described below. The fitting 6040 can further define a stem pipe adaptor shaft 6050, which can comprise a first portion 6052 configured to join the lower stem 1214 comprising the sensing device 1300 to the upper stem 1212 via a stem coupling 8010 (shown in FIG. 8), a second portion 6054 receiving the antenna cover assembly 6060, and a third portion 6056, which can be sized to be received within the stem pipe 2000 and seal against an interior surface of the stem pipe 2000 using, for example, the O-rings 6080a,b).

As shown in FIG. 7, the antenna cover assembly 6060 can comprise a cover 6062, a seal 6068, and fasteners 6069 for securing the cover 6062 via engagement with bores defined in the fitting 6040. As shown, the seal 6068 can be an O-ring and can in any case be configured to seal against water intrusion into a cavity housing the antenna 1370. The cover 6062 can define a pocket 6066 in an interior surface for receiving a tip of the antenna 1370.

The battery pack 6030 can comprise at least one battery 6032 and a battery container 6034. The battery container 6034 can comprise a battery cage 6036, a battery casing 6038, and an O-ring 6039. The battery 6032 can be positioned inside the battery cage 6036, which can be received within the battery casing 6038, an end of which can be received within the O-ring 6039 to seal between the stem pipe 2000 and the battery casing 6038 of the battery container 6034. More specifically, the O-ring 6039 can be received within a casing groove 6037 of the battery casing 6038. The battery 6032 and the battery pack 6030 generally can be in electrical communication with the sensor 3010 to power the sensor 3010.

The sensor printed circuit board (PCB) 6020 can be in electrical communication with the aforementioned sensor 3010 of the lower stem bottom end 3000 and with the battery pack 6030 and can be housed and sealed within the battery container 6034. The sensor PCB 6020 can further comprise a clock 2050 in each of the sensing device 1300 and a communications hub 1920 (shown in FIG. 19) for gathering, synchronization, and reporting of collected data.

The sensor PCB 6020 (and a later-mentioned hub PCB 1940) can be attached to the surrounding structure by fasteners. In various aspects, the fasteners can be any fastener known in the art, including glue, welding, nails, mechanical locks, and mechanical fasteners, among others. In various aspects, the sensor PCB 6020 and the hub PCB 1940 can be various arrangements of electronic components. In various aspects, the PCBs 6020, 1940 can be eliminated by circuitry. The sensor PCB 6020 in the current aspect can be in electrical communication with the sensor 3010.

The battery container 6034, which can comprise the battery cage 6036, can be a semi-rigid container to hold batteries 6032 without substantial bulk. The battery container 6034 can be substantially laddered having a plurality of bands arranged to alternate location on sides of the battery container 6034. As a result, the battery container 6034 can serve as a rigid or semi-rigid container in various aspects for a plurality of batteries 6032. In the current aspect, the battery container 6034 can contain at least two batteries 6032, although any number of batteries can be present in other aspects. The battery container 6034 can be a part of the sensing device 1300.

Figure 8:
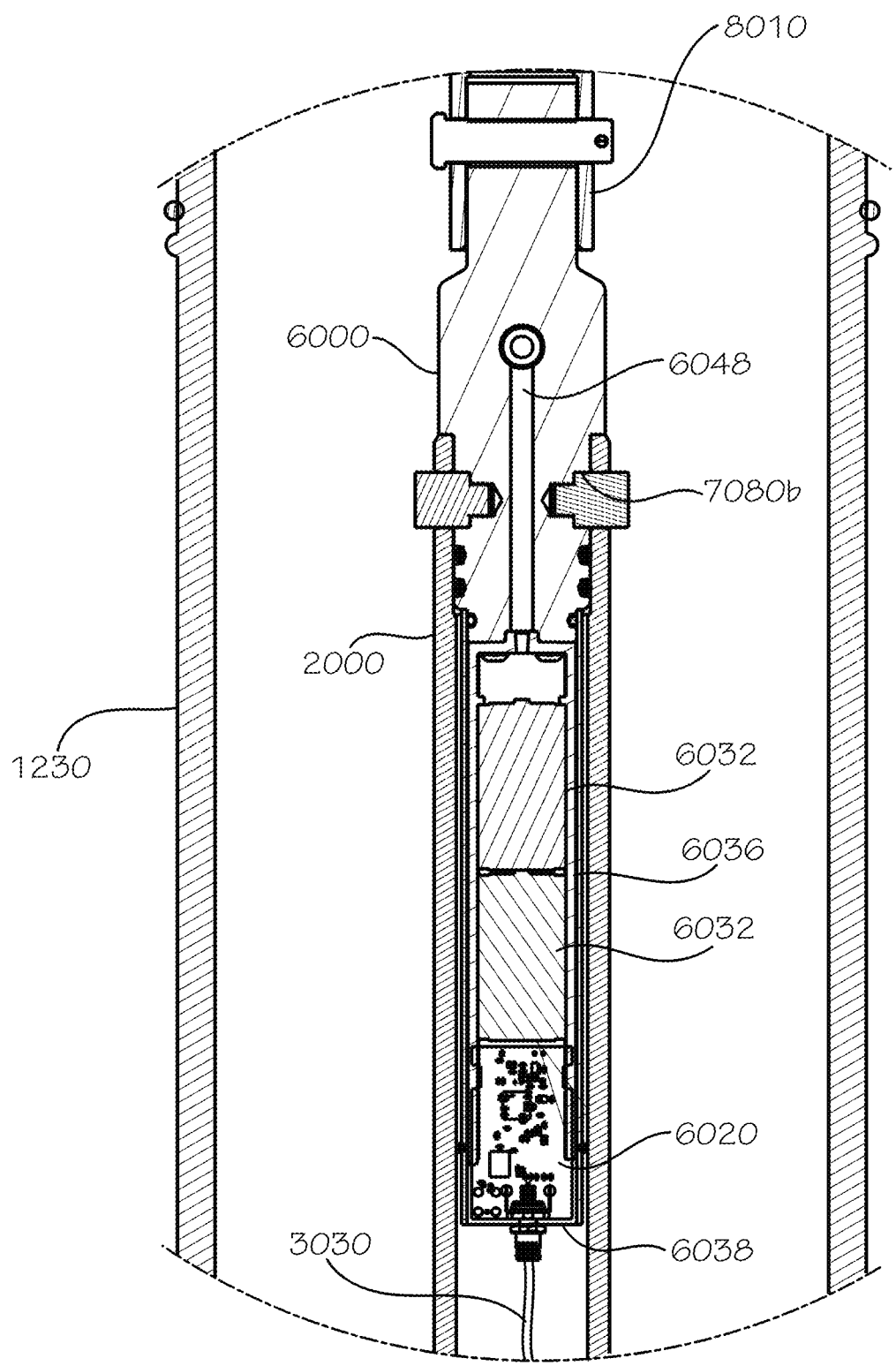
FIG. 8 is a detail sectional view of the hydrant of FIG. 1 taken from detail 8 of FIG. 2 showing the upper stem end of FIG. 6.

FIG. 8 is a detail sectional view of the hydrant 1000 showing the lower stem top end 6000 and surrounding structure. As shown, the fitting 6040 of the lower stem top end 6000 can define an antenna cavity 6048 at an upper end and the sensor wire 3030 in electrical communication at the lower end with both the sensor PCB 6020 and with the sensor 3010 (shown in FIG. 5).

Figure 9:
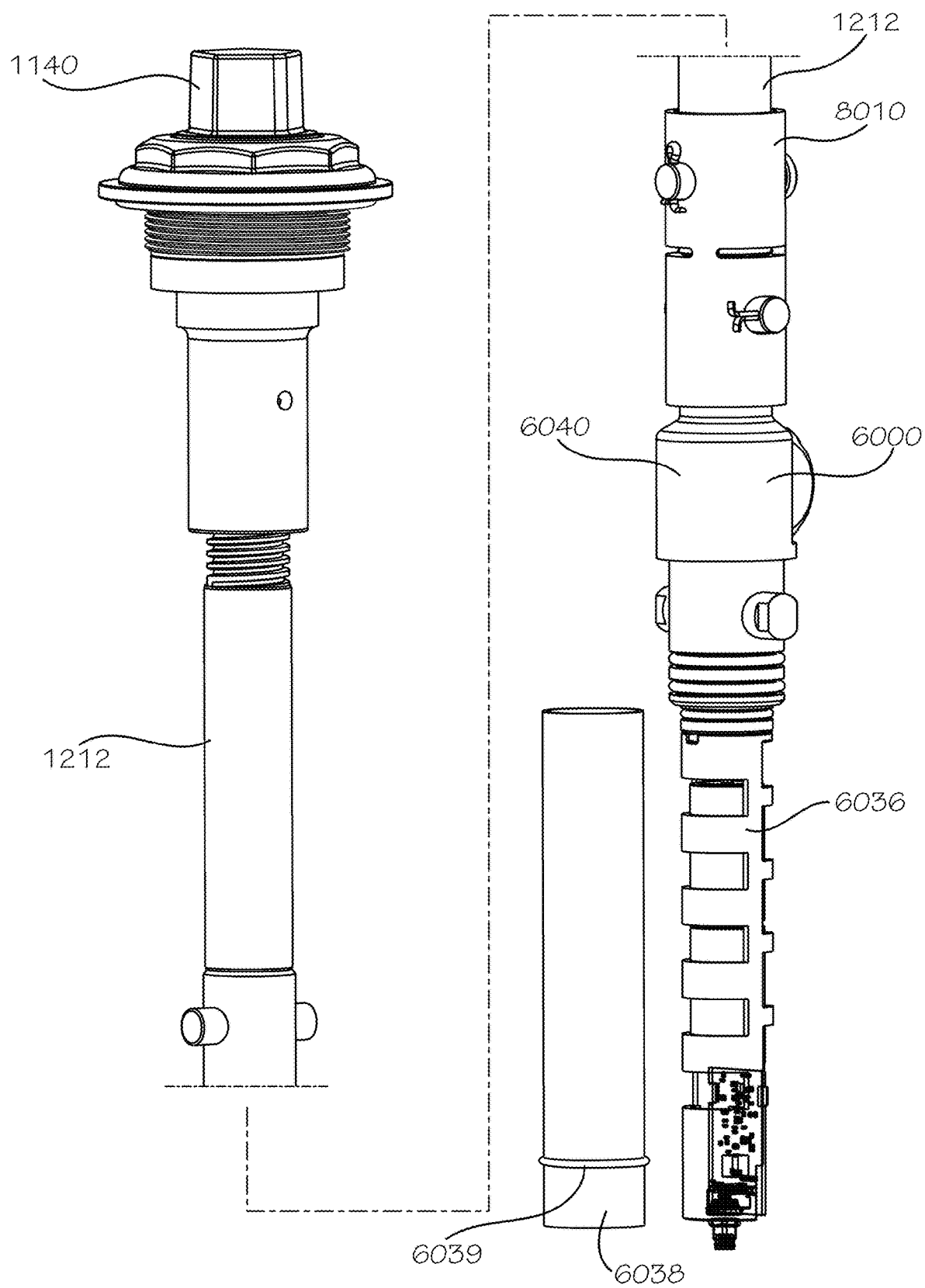
FIG. 9 is a side perspective view of a stem of the hydrant of FIG. 1 extending from an operating nut of the hydrant of FIG. 1 and showing also the upper stem end of the operating stem of the hydrant of FIG. 1 as well as a connection therebetween.

FIG. 9 is a partial side perspective view of the operating stem 1210 of the hydrant 1000 extending from the operating nut 1140 of the hydrant 1000 and the upper stem 1212 and the lower stem top end 6000. As shown, the stem coupling 8010 can join the upper stem 1212 to the lower stem 1214.

Figure 10:
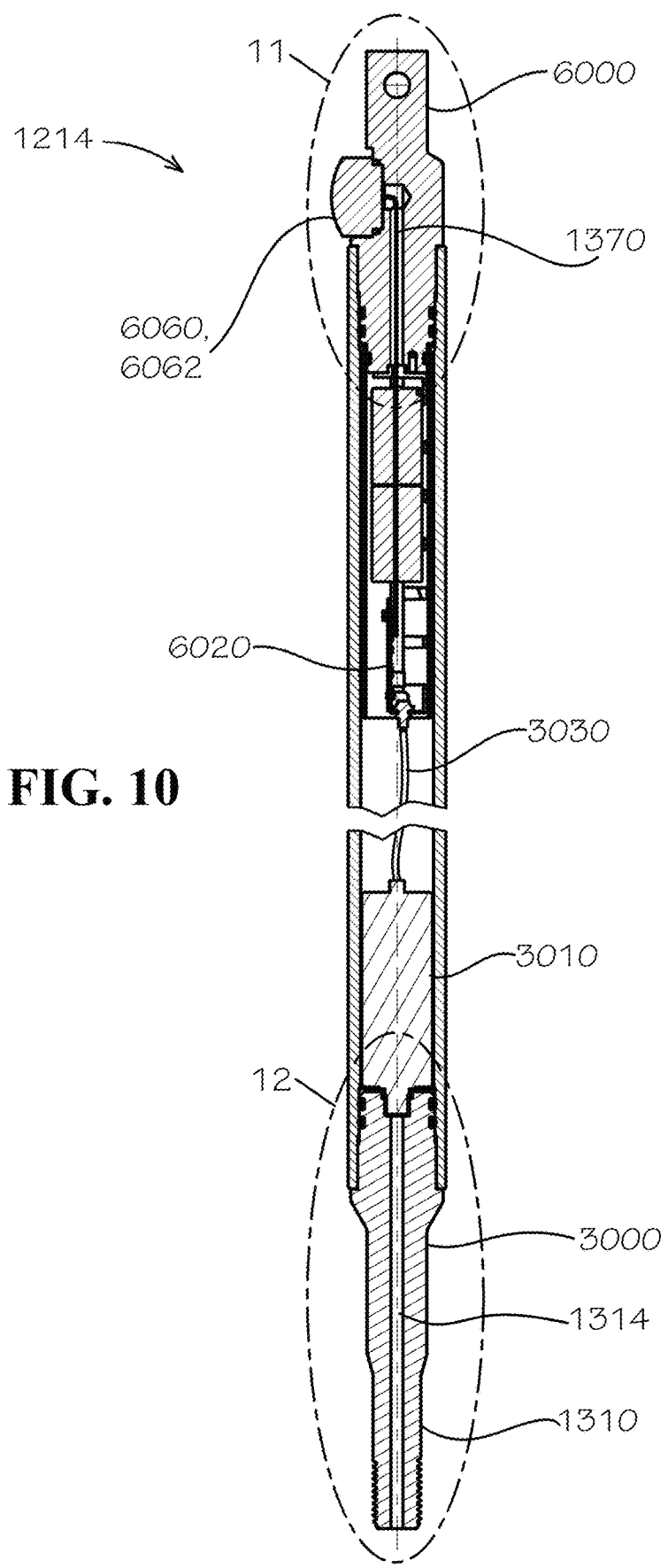
FIG. 10 is a sectional view of the operating stem of FIGS. 3, 4, 6, and 7 taken along line 10-10 of FIG. 2 and in accordance with another aspect of the current disclosure.

FIGS. 10-12 are sectional views of the lower stem 1214 of the operating stem 1210 in accordance with another aspect of the current disclosure showing the relationship between the previously introduced components. The antenna 1370 can be a near-field communication antenna for close-range wireless communications such as using, for example and without limitation, a low-power radio frequency (RF) communication technology such as BLUETOOTH® communications technology. Accordingly, the sensing device 1300 can comprise a radio, which can itself comprise any one or more of the sensor 3010, the sensor PCB 6020, the battery container 6034 or any portion thereof, and the antenna 1370. As shown, each portion of the sensing device except for a surface of the sensor 3010 in fluid communication with the fluid, a surface of the channel 1314, and an exposed outer surface of the housing of the lower stem 1214 can be completely isolated from fluid communication with any fluid surrounding the sensing device 1300. As shown in FIG. 12, an O-ring 3080c can seal a joint between the sensor 3010 and the vein 1310 against fluid intrusion from the channel 1314.

Figure 14:
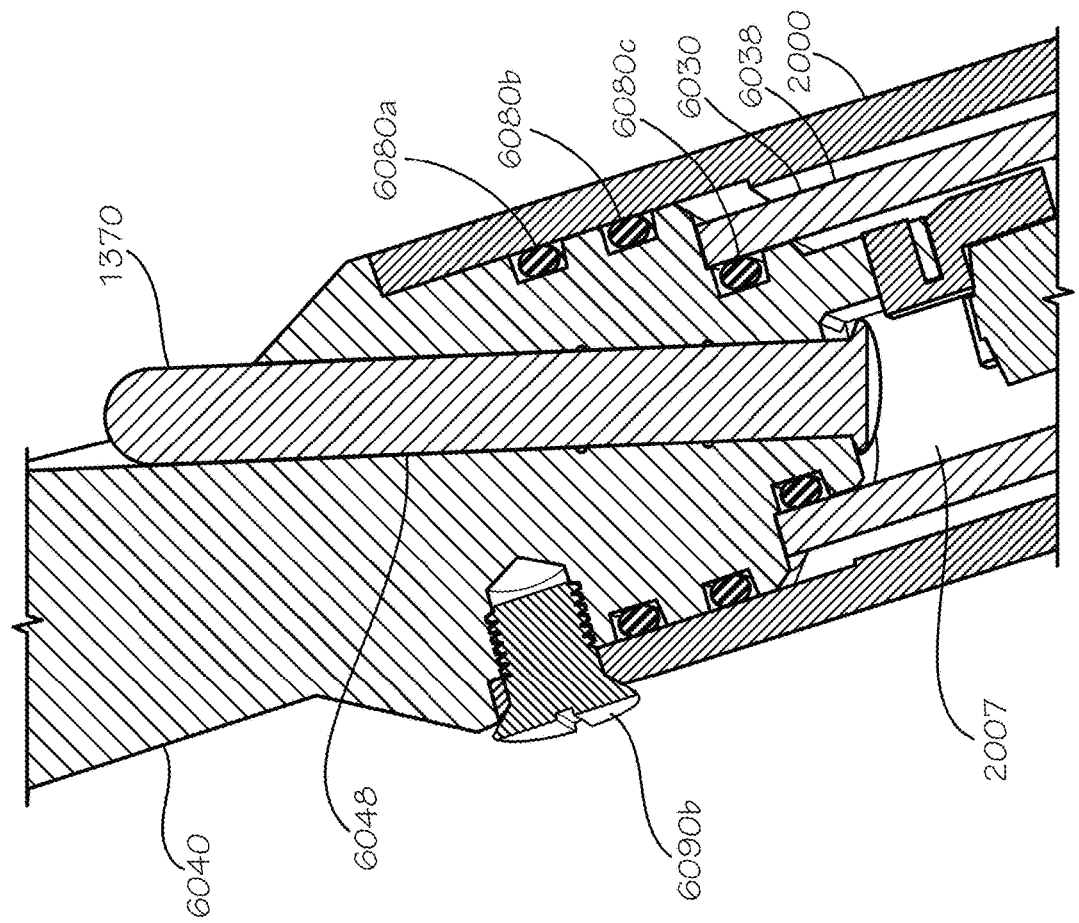
FIG. 14 is a sectional view of the external connection of FIG. 13 taken along line 14-14 of FIG. 13.
Figure 13:
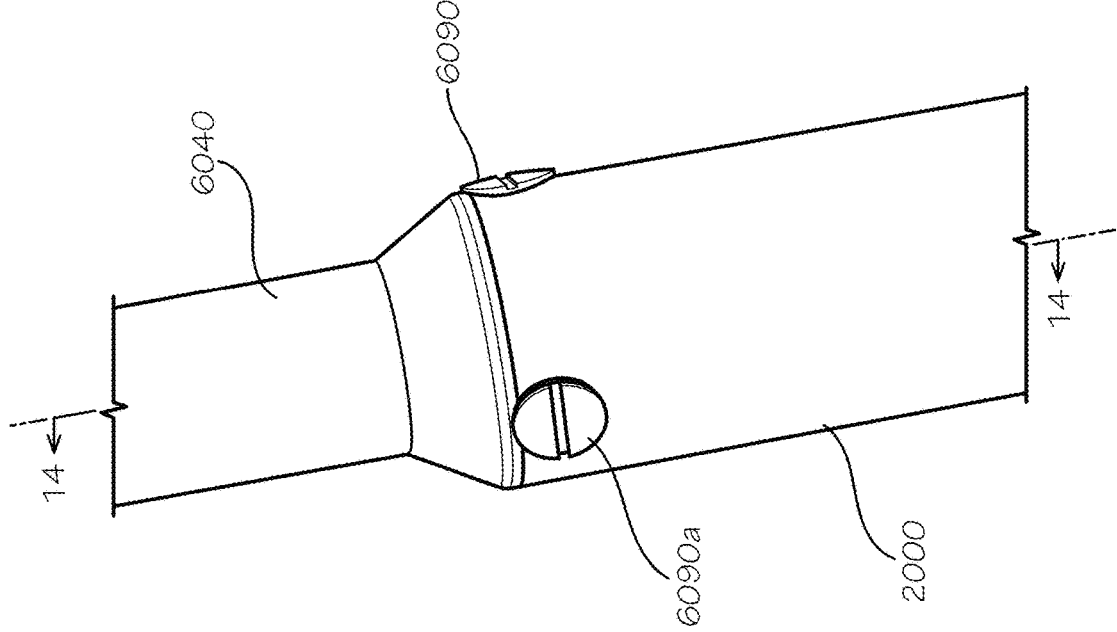
FIG. 13 is a side perspective view of an external connection of the upper stem end of the operating stem of FIG. 10 in accordance with another aspect of the current disclosure.

FIG. 13 is a side perspective view and FIG. 14 is a sectional view of an external connection of the lower stem top end 6000 of the lower stem 1214 in accordance with another aspect of the current disclosure. As shown, the fasteners 6090a,b can be flat head screws extending through the stem pipe 2000 into the fitting 6040. The antenna 1370, while insulated against water intrusion into and past the antenna 1370 into a cavity 2007 occupied by the battery pack 6030 and surrounding structure, need not otherwise be covered as with the aforementioned cover 6062 (shown in FIG. 10). Water intrusion can be prevented by an interference fit between the antenna 1370 and the antenna cavity 6048 and encapsulating the antenna 1370 in a flexible material such as, for example and without limitation, rubber. Moreover, a potting material can be poured inside the battery pack 6030 and covering the sensor PCB 6020 to protect the components from water intrusion.

Figure 15:
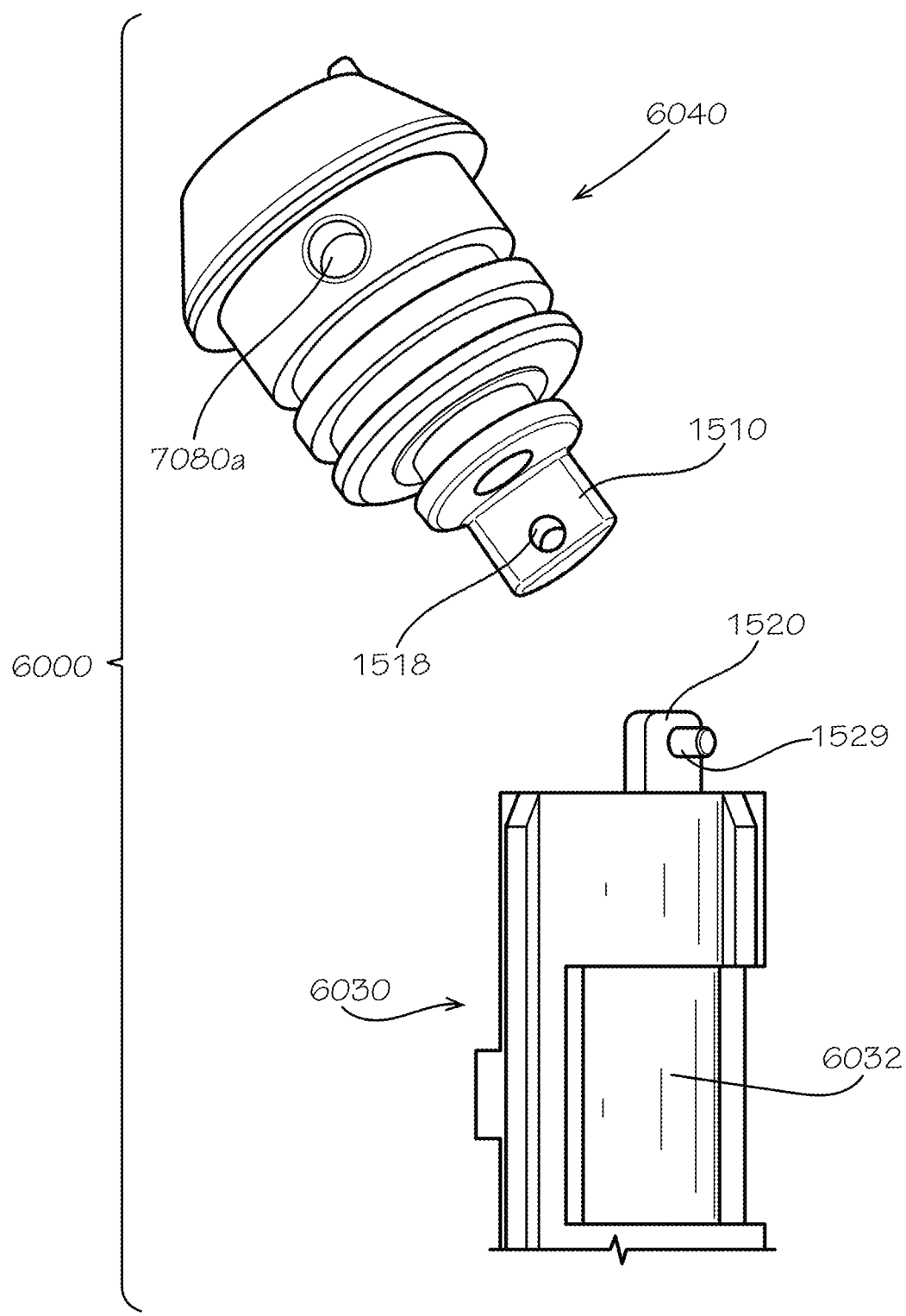
FIG. 15 is a side perspective view of an internal connection of the upper stem end of the operating stem of FIG. 10 in accordance with another aspect of the current disclosure.

FIG. 15 is a side perspective view of an internal connection of the lower stem top end 6000 of the lower stem 1214 in accordance with another aspect of the current disclosure. As shown, the fitting 6040 can comprise a tab 1510 configured to join with a tab 1520 of the battery pack 6030. More specifically, the tab 1510 can define a hole 1518, and the tab 1520 can comprise a fastener 1529, which can be sized to be received within the hole 1518 and thereby join the parts during assembly of the lower stem top end 6000, which to some degree must be "blind" in that access is not available to internal parts of the sensing device 1300 once the fitting 6040 is inserted into the stem pipe 2000 (shown in FIG. 14).

Figure 16:
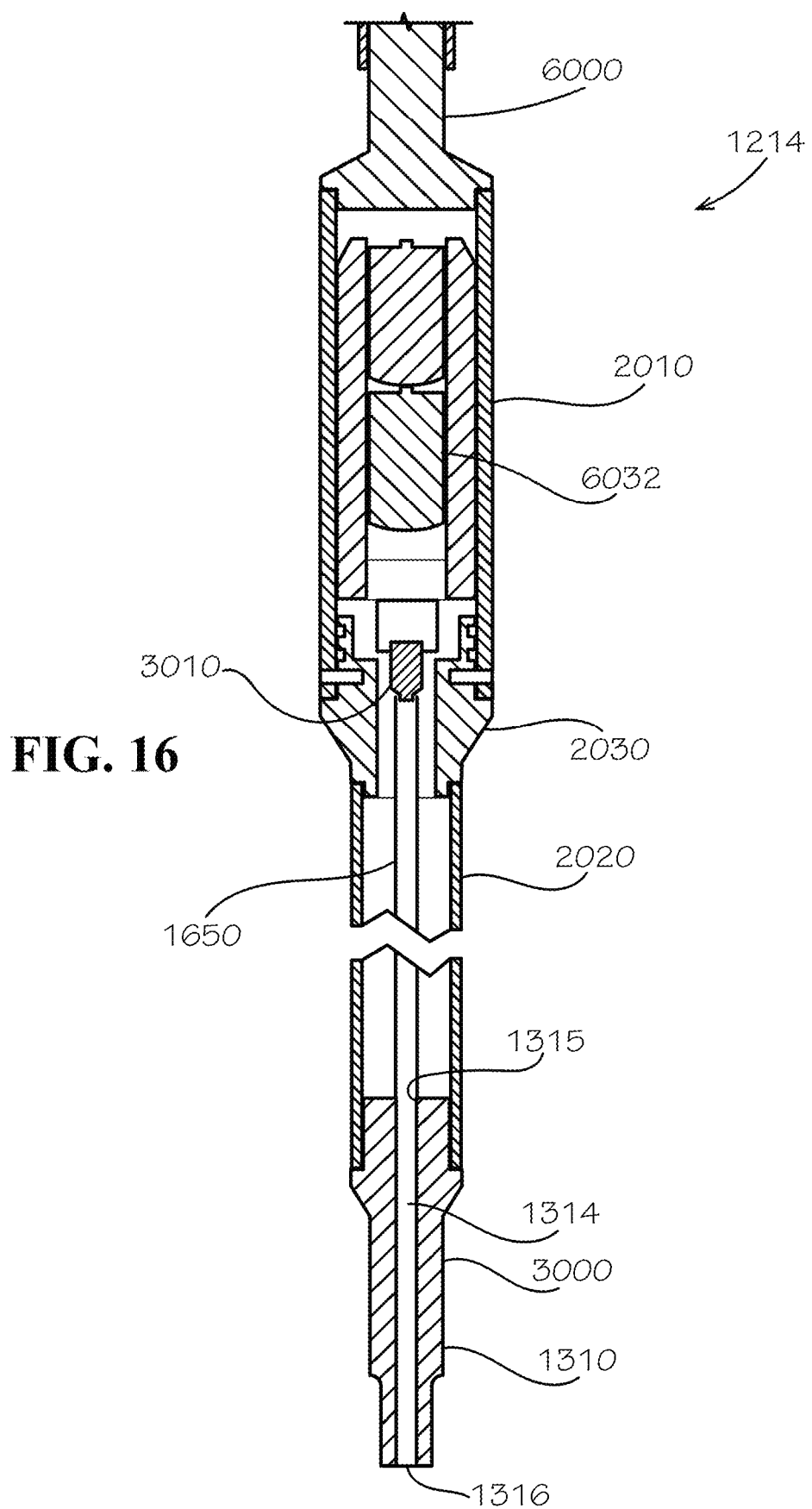
FIG. 16 is a sectional view of the operating stem of the hydrant of FIG. 1 in accordance with another aspect of the current disclosure.

FIG. 16 is a sectional view of the lower stem 1214 of the operating stem 1210 of the hydrant 1000 in accordance with another aspect of the current disclosure. As shown, the stem pipe 2000 can comprise an upper portion 2010 and a lower portion 2020 joined to the upper portion by a connector 2030. At least in part, by forming the stem pipe 2000 from multiple components, the upper portion 2010 can be made from a larger diameter housing for larger batteries 6032 and other internal components—for increased run time of the sensing device 1300, for example—without increasing the size of the lower portion 2020 and the ability of the lower portion 2020 to mate with parts in inventory and in the field such as the reinforcement member 1280, the valve member 1250, and the valve retainer 1260 shown. Also as shown, the sensor 3010 can be positioned further away from an exit or bottom end 1316 of the channel 1314 in the sensing device 1300 and even beyond a top end 1315 of the channel 1314 of the vein 1310 by, for example and without limitation, joining the channel 1314 and the sensor with a conduit 1650 configured to allow the fluid of the fluid distribution system only to a sensing portion of the sensor 3010.

Figure 17:
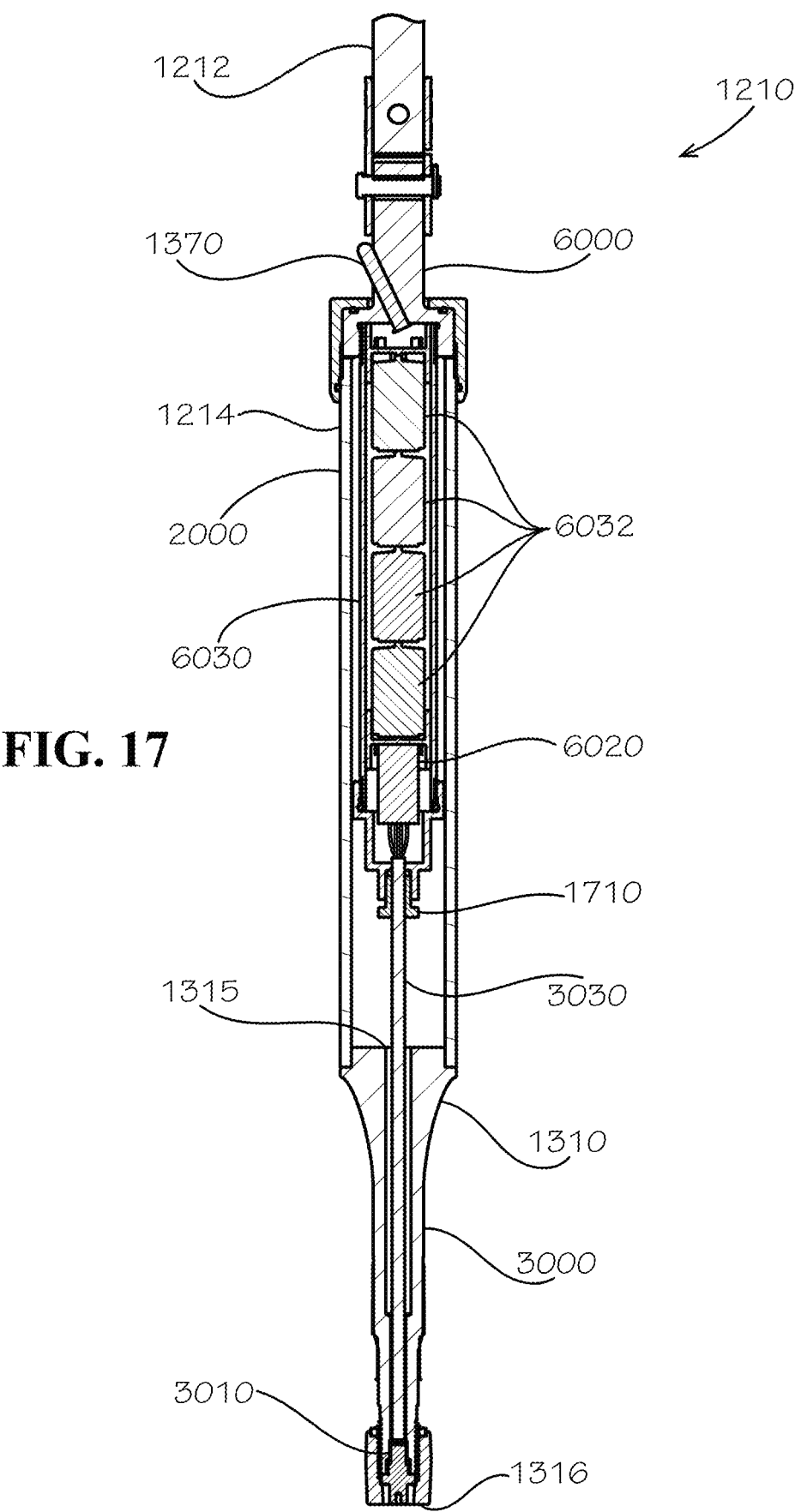
FIG. 17 is a sectional view of the operating stem of the hydrant of FIG. 1 in accordance with another aspect of the current disclosure.

FIG. 17 is a sectional view of the operating stem 1210 of the hydrant 1000 in accordance with another aspect of the current disclosure. As shown, the sensor 3010 can be positioned proximate to the bottom end 1316 of the vein. In addition, as shown, additional batteries can be incorporated into the battery pack 6030 and a diameter of the stem pipe 2000 can be increased to make room for additional components. This can be achieved, for example and without limitation, by widening an upper end of the vein 1310 where connected with the stem pipe 2000. As shown, the sensor wire 3030 can be soldered to the sensor PCB 6020 and, in addition to or as a substute for the aforementioned potting material, a seal 1710 can be positioned around the wire 3030 at an entrance to the battery pack 6030 to prevent water intrusion.

Figure 18:
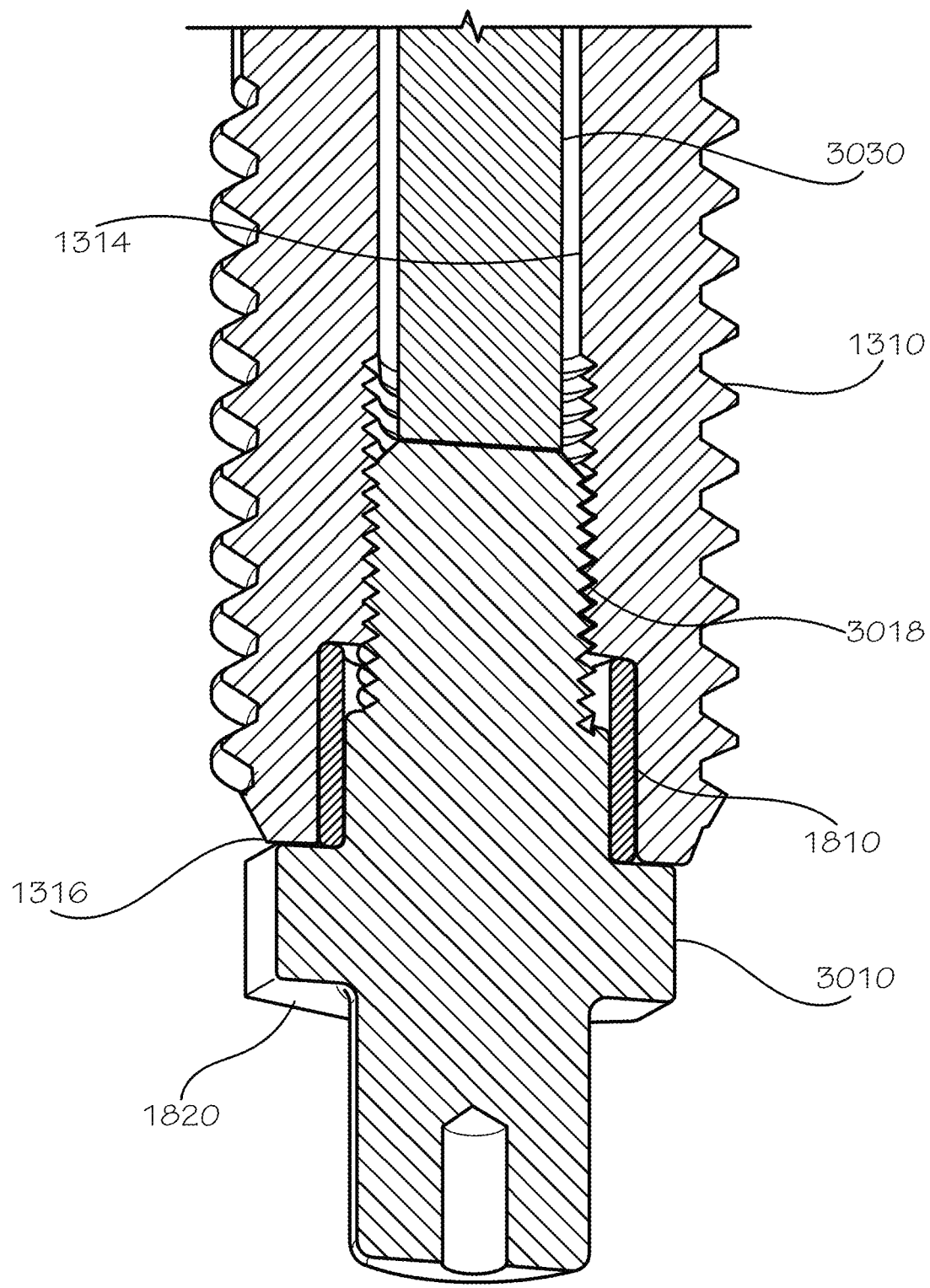
FIG. 18 is a detail sectional perspective view of a lower end of the operating stem of FIG. 17.

FIG. 18 is a detail sectional perspective view of a lower end of the operating stem 1210 showing the sensor 3010 at the bottom end 1316 of the vein 1310. As shown, the sensor 3010 can be inserted into the channel 1314 and a seal 1810 can be positioned therebetween, which can be a flat annular seal. The sensor 3010 can further comprise a flange 1820, which can additionally contact and seal against the bottom end 1316 of the vein 1310.

Figure 19:
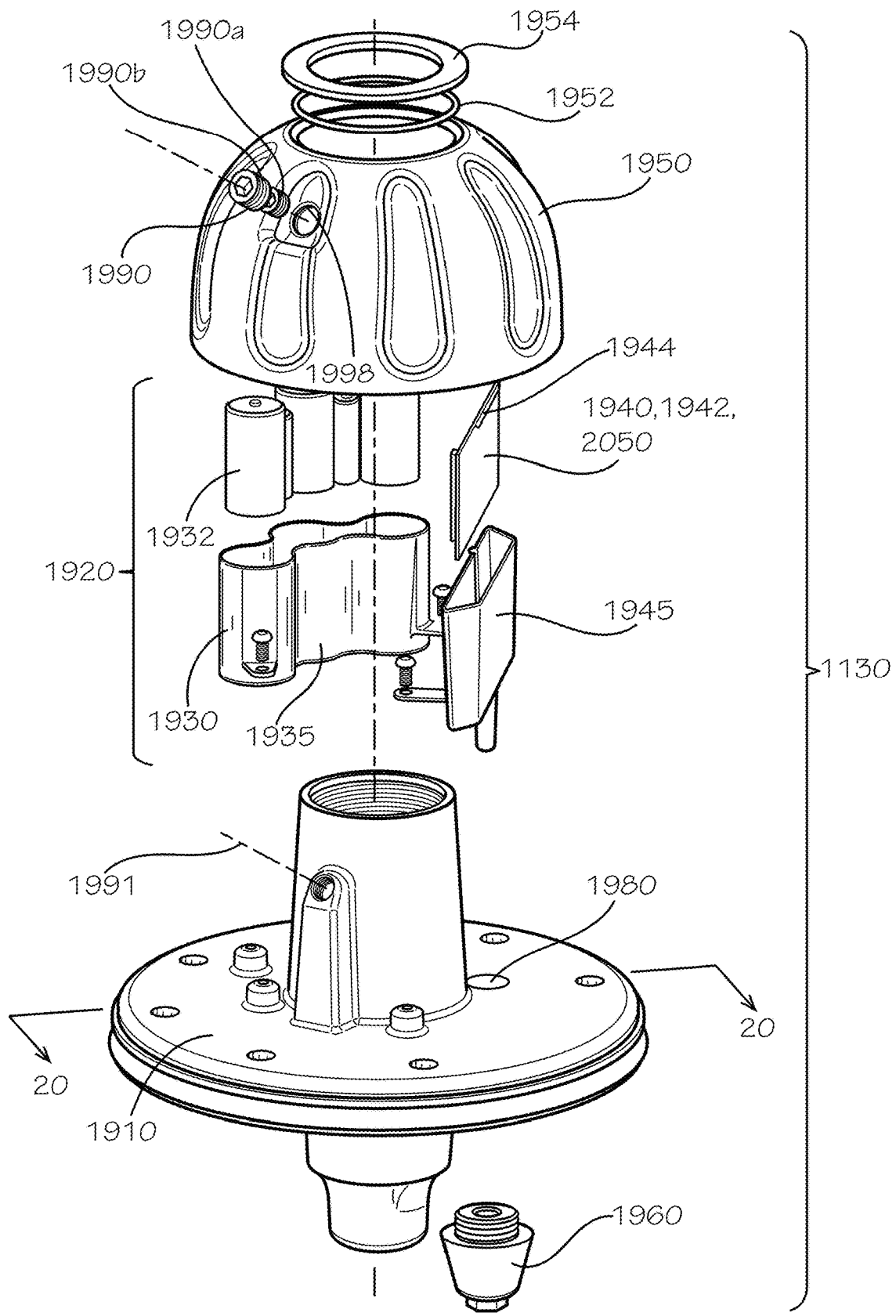
FIG. 19 is an exploded top perspective view of a bonnet assembly of the hydrant of FIG. 1.

FIG. 19 is an exploded top perspective view of the bonnet 1130 of the hydrant 1000. The bonnet 1130 can comprise a flange 1910, typically formed from metal, for sealing off the hydrant 1000 at a top end of the upper barrel 1110 (shown in FIG. 1). The bonnet 1130 can further comprise a communications hub 1920 and a separate weather cover 1950. The communications hub 1920 can be in wireless communication with the antenna 1370 of the sensing device 1300 and can comprise a hub printed circuit board (PCB) 1940 configured to process data from the sensing device 1300. As contemplated, the data can correspond to a property of the fluid of the fluid distribution system including but not limited to pressure data. The communications hub 1920 can further comprise at least one battery 1932 in electrical communication with the hub PCB 1940. The communications hub 1920 can further comprise a receiving antenna in wireless communication with the sensing device 1300 and in electrical communition with the hub PCB 1940. The communications hub 1920 can further comprise a PCB housing 1945, in which the hub PCB can be positioned, and a battery pack 1930, which can comprise a battery housing 1935, in which the at least one battery 1832 can be positioned.

The hub PCB 1940 can comprise a first antenna 1942 for receiving data wirelessly from the antenna 1370 of the sensing device 1300 and a second antenna 1924 for sending data wirelessly to a network separate from the hydrant 1000, which can be a cloud-based server. One of the antennas 1942,1944 can comprise a trace antenna positioned on a surface of the hub PCB 1940. One of the antennas 1942, 1944 can be a near-field communication antenna. In addition, a third antenna 1946 can receive data using GPS technology to identify the location of the hydrant 1000 in the system and also the time, which information can be used by the hub PCB 1940 including the clock 2050 therein to time-stamp and otherwise synchronize and organize measured data. The communications hub 1920 can be positioned inside a bonnet cavity 2070 (shown in FIG. 20) and isolated from the interior cavity 1006 (shown in FIG. 2) of the hydrant body 1105 (shown in FIG. 2). The bonnet 1130 can further comprise a plug 1960, formed from a non-metallic material, which can fit within a bore 1980 extending from an upper surface of the flange to a lower surface of the flange 1910 below a position occupied by the hub PCB 1940. In addition, as will be discussed in more detail below, an oil fill plug 1990 can be installed through the weather cover 1950 and partly through the flange 1910 and can be aligned along an oil fill bore 1998 defining an oil fill bore axis 1991. The oil fill plug 1990 can be removed to provide access to a portion of the upper stem 1212 to be able to inject oil for lubricating the upper stem 1212 to faciliate its smooth movement. In some aspects, as shown, the oil fill plug 1990 can comprise two separate plugs—one oil fill plug 1990*a* installed in the bore 1998 in the flange 1910 and one oil fill plug 1990*b* installed in the weather cover 1950. A seal 1952, which can be an O-ring, and a washer 1954 can be positioned between the weather cover 1950 and the operating nut 1140.

Figure 20:
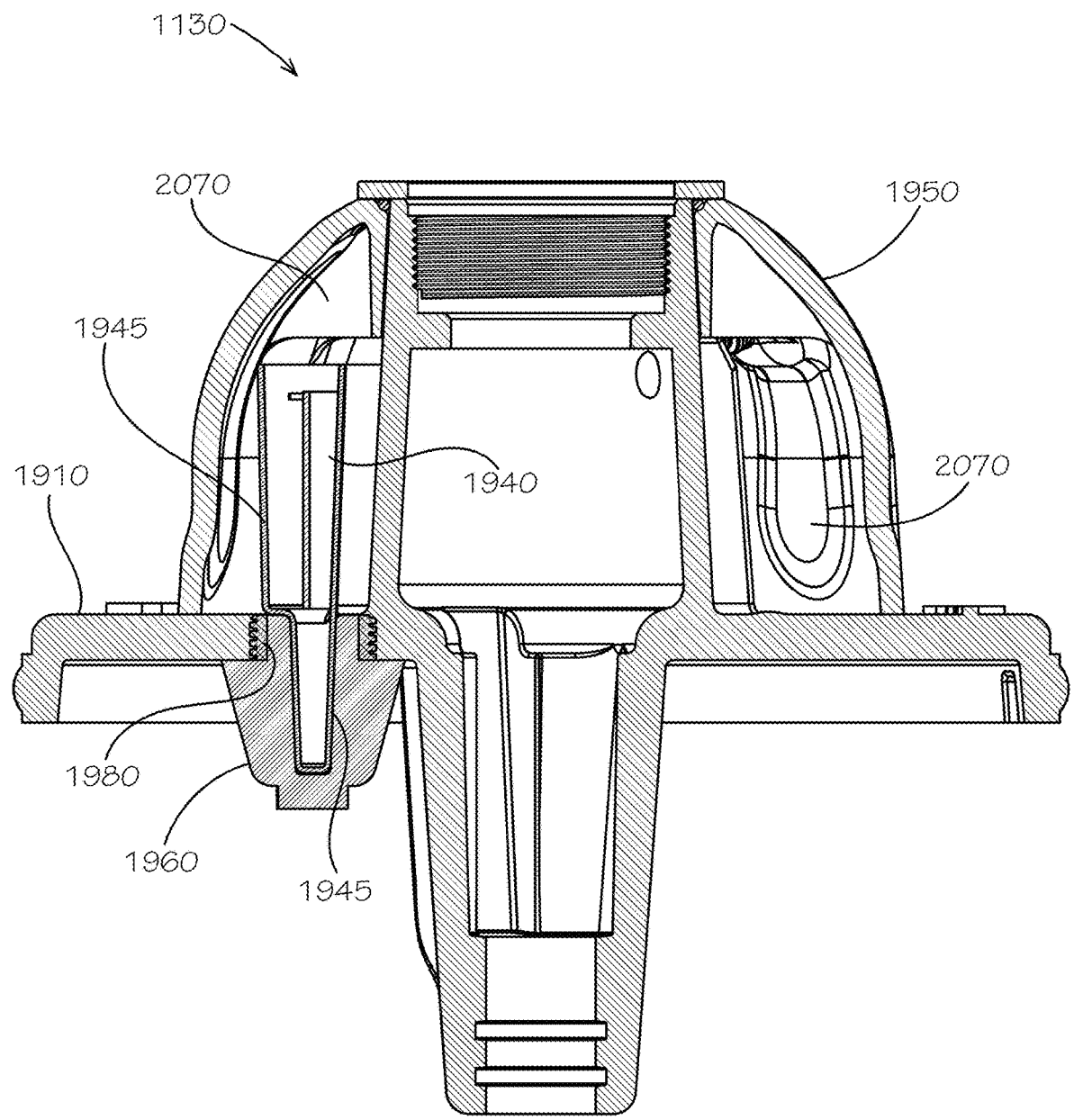
FIG. 20 is a sectional view of the bonnet assembly of FIG. 19 taken along line 20-20 of FIG. 19.

FIG. 20 is a sectional view of the bonnet 1130. As shown, the flange 1910 and the weather cover 1950 can define the bonnet cavity 2070 therebetween. The bonnet cavity 2070 can wrap around the inside of the bonnet 1130. As shown, at least a portion of the housing 1945—and the hub PCB 1940—can extend through the plug bore 1980.

Figure 21:
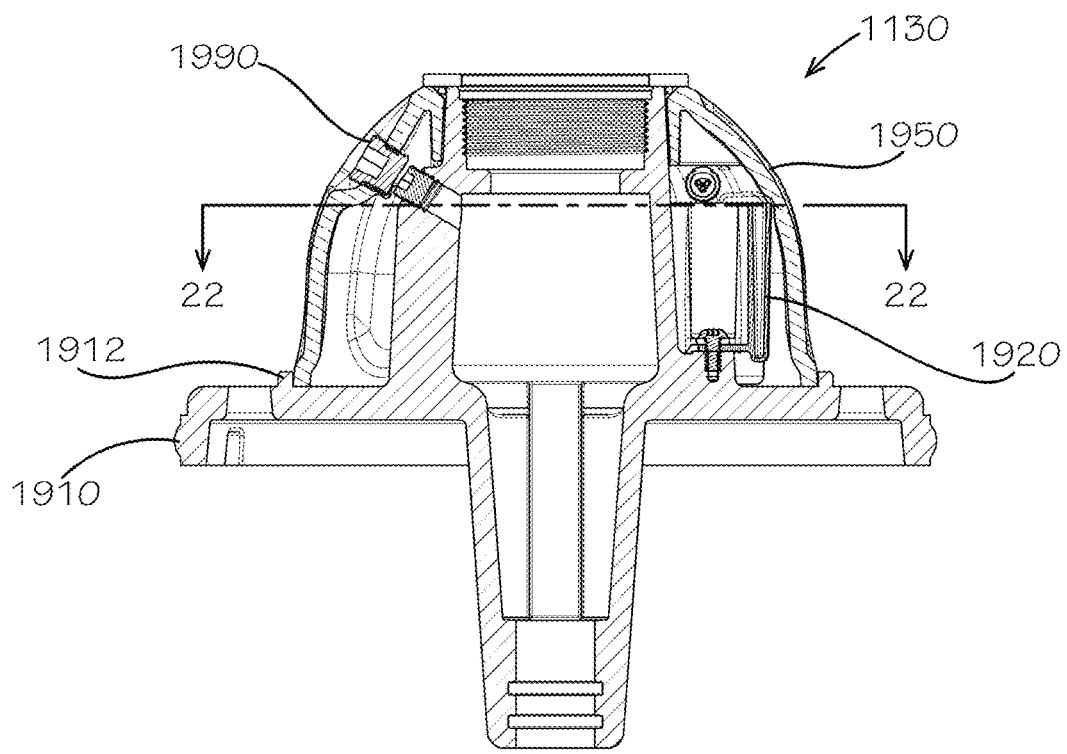
FIG. 21 is a side sectional view of the bonnet assembly of FIG. 20 in accordance with another aspect of the current disclosure.

FIG. 21 is a side sectional view of the bonnet 1130 in accordance with another aspect of the current disclosure. As shown, the flange 1910 can comprise a shoulder 1912, which can be configured to seal a joint between the weather cover 1950 and the flange 1910. The shoulder 1912 can have an annular shape and can extend from or be defined in an upper surface of the flange 1910.

Figure 22:
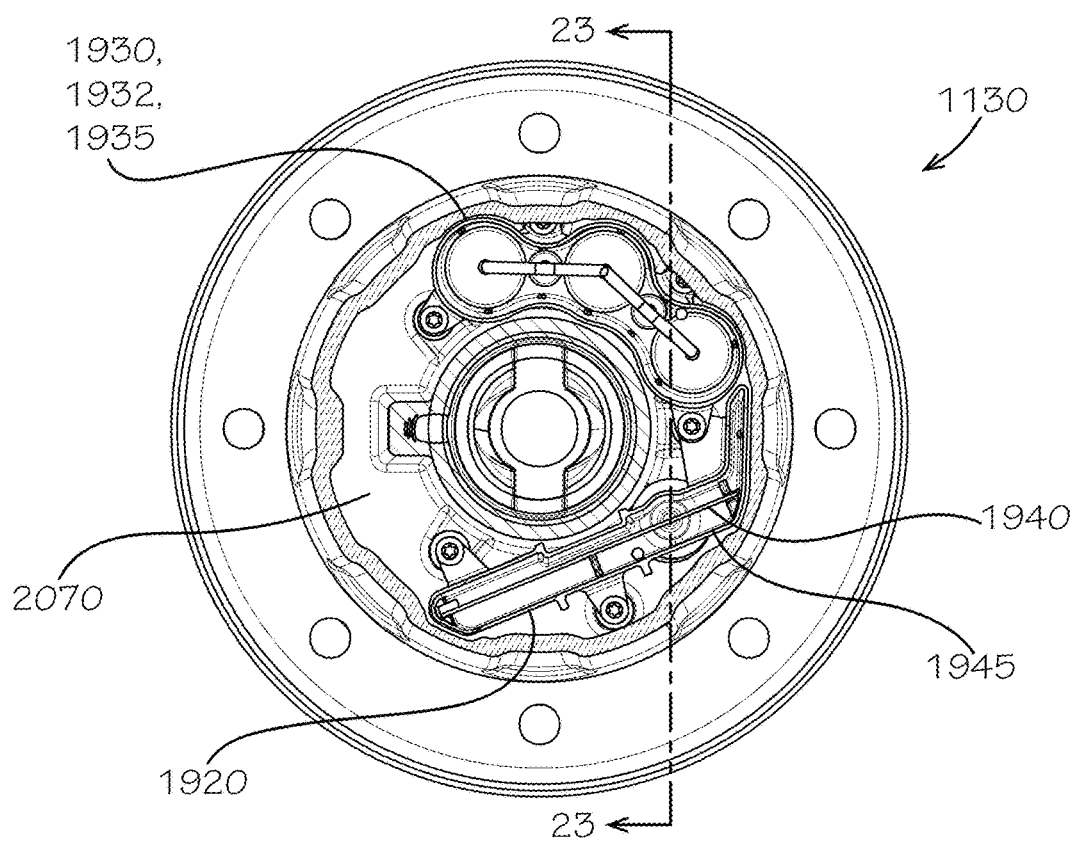
FIG. 22 is a top sectional view of the bonnet assembly of FIG. 21 taken along line 22-22 of FIG. 21.

FIG. 22 is a top sectional view of the bonnet 1130 showing the communications hub 1920 comprising the battery pack 1930 with batteries 1932 and the battery housing 1935 and also comprising the hub PCB 1940 and the housing 1945. As shown, the components of the communications hub 1920 can be arranged in a semicircular pattern or shape inside the bonnet cavity 2070.

Figure 23:
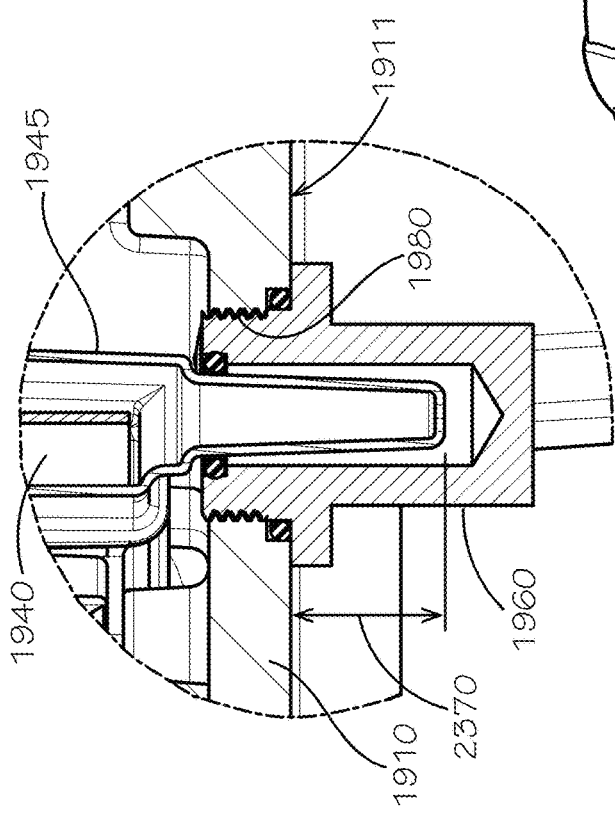
FIG. 23 is a side sectional view of the bonnet assembly of FIG. 21 taken along line 23-23 of FIG. 22 showing an antenna plug of the bonnet assembly.

FIG. 23 is a side sectional view of the bonnet 1130 showing the plug 1960 in accordance with another aspect of the current disclosure. As shown, at least a portion of the housing and the antenna 1942—mounted on the hub PCB 1940 but not itself visible except in FIG. 26—can extend through the plug bore and beyond the lower surface 1911 of the flange 1910 by an extension distance 2370 as measured from the lower surface 1911.

Figure 24:
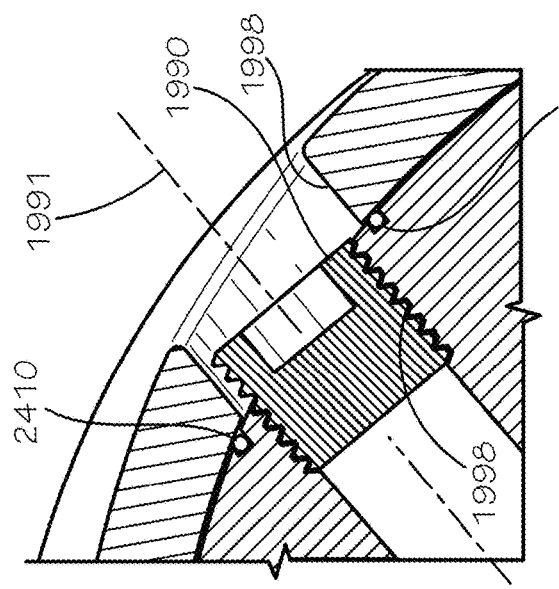
FIG. 24 is a sectional perspective view of an oil fill plug of the hydrant of FIG. 1.

FIG. 24 is a sectional perspective view of the aforementioned oil fill plug 1990 of the bonnet 1130. As shown, the oil fill plug 1990—which can be a single component in contrast to the structure shown in FIGS. 19 and 21—can be aligned with the oil fill bore axis 1991 and installed through the oil plug bore 1998 defined in each of the weather cover 1950 and the flange 1910. A seal 2410, such as an O-ring or gasket, can be positioned between the weather cover 1950 and the flange 1910 to seal a joint therebetween. In some aspects, the seal 2410 can be incorporated into the weather cover 1950 by overmolding.

Figure 25:
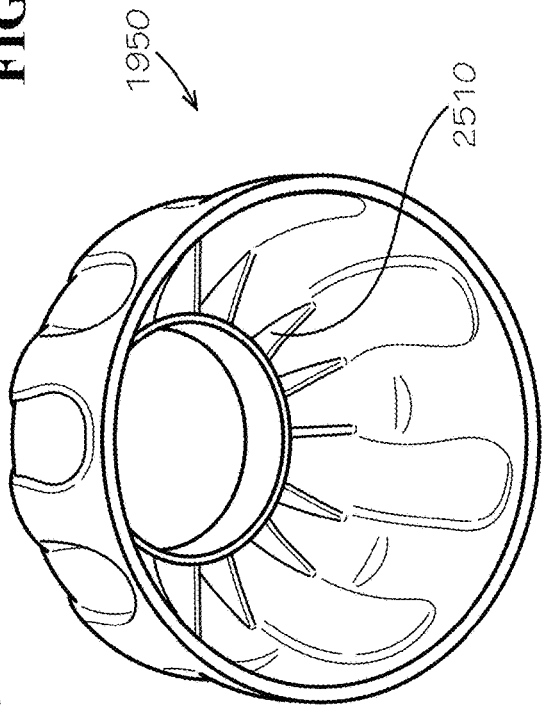
FIG. 25 is a bottom perspective view of a weather cover of the bonnet assembly of FIG. 20.

FIG. 25 is a bottom perspective view of the weather cover 1950 of the bonnet 1130. The weather cover 1950, which can be formed but a non-metallic material for passage of a wireless signal, can be strengthened by ribs 2510 and can also be strengthened by strengthening materials such a glass fiber.

Figure 26:
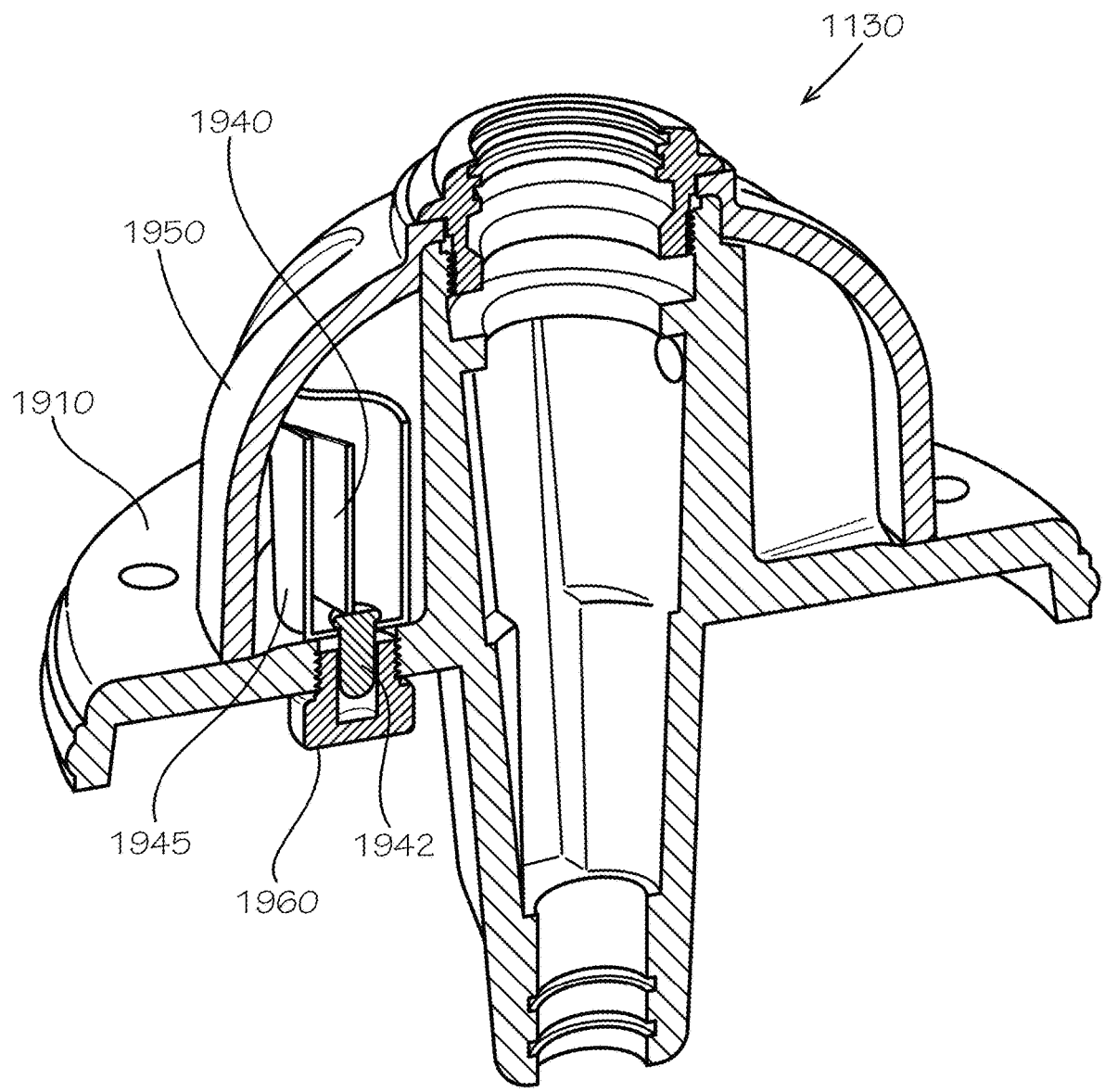
FIG. 26 is a sectional perspective view of the antenna plug of the hydrant of FIG. 1 in accordance with another aspect of the current disclosure.

FIG. 26 is a sectional perspective view of the antenna plug 1960 of the hydrant 1000 in accordance with another aspect of the current disclosure.

Unless otherwise specified, one or more of the components of the hydrant 1000 disclosed herein can comprise or be formed from a metal such as, for example and without limitation, cast iron, silicon bronze, or stainless steel. Components made from a nonmetallic material such as, for example and without limitation, a polymer material or a rubber or other elastomeric material can include covers for the antennas 1942,1944 (shown in FIG. 19) including the cover 6062 (shown in FIG. 7), the battery cage 6036 (shown in FIG. 7), the battery casing 6038 (shown in FIG. 7), the battery housing 1935 (shown in FIG. 19), the weather cover 1950 (shown in FIG. 19), the PCB housing 1945 (shown in FIG. 19), and the plug 1960 (shown in FIG. 19).

A method of measuring a characteristic of a fluid inside the fluid distribution system can comprise receiving a fluid inside the channel 1314 of the vein 1310 of the operating stem 1210 of the hydrant 1000 at a vertical position below the valve 1200 and below the valve member 1250. The method can further comprise recording data corresponding to a characteristic of the fluid such as, for example and without limitation, fluid pressure with the sensing device 1300. In other aspects, the sensor 3010 of the sensing device 1300 can be of a variety of sensors known in the art, including pressure, temperature, salinity, purity, and various other sensing types. The method can further comprise transmitting the data to the antenna 1370. The method can further comprising wirelessly transmitting the data to a second antenna 1944 in wireless communication with the sensing device 1300. The method can further comprise powering the sensing device 1300 with the at least one battery 6032.

A method of processing measurements of the fluid inside the fluid distribution system can comprise receiving data wirelessly into the communications hub 1920 from the sensing device 1300 of the hydrant 1000, and transmitting the data to the second antenna 1944. Transmitting the data to the second antenna 1944 can comprise transmitting the data through the flange 1910 of the hydrant 1000 via the plug 1960 formed from a non-metallic material. The method can further comprise transmitting the data wirelessly from the second antenna 1944 to the network. The method can further comprise synchronizing the data by use of a clock 2050 in each of the sensing device 1300 and the communications hub 1920.

A method of using the data can comprise monitoring the data on a dashboard available to technicians and others responsible for maintenance and support of the fluid distribution system, the dashboard configured to show data for each of the measured characteristics of the fluid being transported by the system.

The hydrant 1000 can be equipped with apparatus sufficient to sense water flow characteristics. The hydrant 1000 can be equipped with apparatus sufficient to communicate from the hydrant 1000 to outside nodes of a network. The hydrant 1000 can be equipped with apparatus sufficient to communicate from one location within the hydrant 1000 to another location within the hydrant 1000 for repeating outside the network. In various aspects, the hydrant 1000 can communicate sensed data from the water flow. One of skill in the art would understand that the disclosed hydrant 1000 provides but a few exemplary aspects that can be implemented in many ways with sufficient knowledge and skill in the art.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A hydrant for a fluid distribution system, the hydrant comprising:
    a hydrant body defining a top end, a bottom end, an interior cavity, and a shoe cavity;
    a valve located in sealable communication with the hydrant body, the interior cavity in fluid communication with the shoe cavity when the valve is open, the valve configured to seal the interior cavity of the hydrant from the shoe cavity when the valve is closed, the valve comprising a valve member defining a member bore;
    a stem secured to the valve, positioned at least partly inside the interior cavity of the hydrant, and extending from the top end of the hydrant body to the valve, the stem configured to open and close the valve, the stem comprising a vein defining a channel extending from a lower end of the vein to an upper end of the vein; and
    a sensing device comprising:
        a sensor located entirely within the interior cavity of the hydrant body and configured to measure a property of a fluid of the fluid distribution system;
        at least one battery in communication with the sensor and located entirely within the interior cavity of the hydrant body; and
        an antenna in communication with the sensor and located entirely within the interior cavity of the hydrant body.

2. The hydrant of claim 1, wherein the channel of the vein is in fluid communication with each of the shoe cavity and the sensor.

3. The hydrant of claim 1, wherein the sensor is a pressure sensor.

4. The hydrant of claim 1, wherein the sensing device further comprises a battery container enclosing the at least one battery, the battery container enclosed within the stem.

5. The hydrant of claim 1, further comprising a communications hub in wireless communication with the sensor, the communications hub positioned inside a bonnet cavity defined by a bonnet of the hydrant, the bonnet positioned proximate to the top end of the hydrant, the communications hub configured to wirelessly relay data collected by the sensor to a network.

6. The hydrant of claim 5, wherein the sensing device comprises a radio configured to wirelessly relay data collected by the sensor to the communication hub.

7. The hydrant of claim 1, wherein the vein extends through the member bore of the valve member.

8. A sensing device for a hydrant, the sensing device comprising:
    a housing defining a portion of an operating stem of the hydrant;
    a vein connected to the housing, the vein defining a channel;
    a sensor received within the channel of the vein; and
    an antenna in communication with the sensor and positioned within the housing.

9. The sensing device of claim 8, wherein the sensor is a pressure sensor.

10. The sensing device of claim 8, wherein the antenna is a near-field communication antenna.

11. The sensing device of claim 8, wherein the sensing device further comprises a PCB in electrical communication with the sensor.

12. The sensing device of claim 8, further comprising a battery container enclosing at least one battery.

13. The sensing device of claim 8, wherein the vein comprises a valve stem shaft and two lobes extending in a radial direction from the valve stem shaft relative to an axis of the valve stem shaft, the two lobes configured to fix a rotational position of the valve relative to the vein.

14. The sensing device of claim 8, wherein an interior of the housing is isolated from fluid communication with any fluid surrounding the sensing device.

15. The sensing device of claim 8, wherein the sensing device comprises a radio configured to wirelessly relay data collected by the sensor via the antenna to a communications hub in a bonnet of the hydrant.

16. A method comprising:
    measuring a characteristic of a fluid inside a hydrant of a fluid distribution system with a sensing device, the sensing device comprising:
a vein defining a channel;
a sensor received within the channel of the vein;
at least one battery in communication with the sensor; and
an antenna in communication with the sensor; and
transmitting data corresponding to the characteristic of the fluid from the sensor to the antenna.

17. The method of claim 16, wherein the antenna is a first antenna mounted to a lower stem of a stem of the hydrant, the hydrant further comprising a second antenna mounted to a bonnet of the hydrant and in wireless communication with the sensing device, the method further comprising wirelessly transmitting the data from the first antenna to the second antenna.

18. The method of claim 16, wherein the characteristic is a pressure of the fluid.

19. The method of claim 16, further comprising synchronizing the data with a clock in each of the sensing device and a communications hub of the hydrant.

20. The method of claim 16, further comprising powering the sensing device with the at least one battery.

\* \* \* \* \*